United States Patent
Gopal et al.

(10) Patent No.: US 10,379,854 B2
(45) Date of Patent: Aug. 13, 2019

(54) PROCESSOR INSTRUCTIONS FOR DETERMINING TWO MINIMUM AND TWO MAXIMUM VALUES

(71) Applicant: INTEL CORPORATION, Santa Clara, CA (US)

(72) Inventors: Vinodh Gopal, Westborough, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 77 days.

(21) Appl. No.: 15/387,823

(22) Filed: Dec. 22, 2016

(65) Prior Publication Data

US 2018/0181394 A1 Jun. 28, 2018

(51) Int. Cl.
*G06F 9/30* (2018.01)
*G06F 15/80* (2006.01)

(52) U.S. Cl.
CPC ........ *G06F 9/30021* (2013.01); *G06F 9/3001* (2013.01); *G06F 9/30109* (2013.01); *G06F 9/30112* (2013.01); *G06F 15/8007* (2013.01)

(58) Field of Classification Search
CPC .................................................. G06F 9/30021
See application file for complete search history.

(56) References Cited

U.S. PATENT DOCUMENTS 5,051,939 A * 9/1991 Nakamura ............... G06F 7/00
708/207

5,715,186 A * 2/1998 Curtet ..................... G06F 7/544
708/207

(Continued)

OTHER PUBLICATIONS

Deutsch, P., "DEFLATE Compressed Data Format Specification Version 1.3", Available online at <http://www.faqs.org/rfcs/rfc1951_html>, May 1996, 13 pages.
Huffman, David A., "A Method for the Construction of Minimum Redundancy Codes", Proceedings of the Institute of Radio Engineers, vol. 40, No. 9, Sep. 1952, pp. 1098-1101.

(Continued)

*Primary Examiner* — Andrew Caldwell
*Assistant Examiner* — Michael J Metzger
(74) *Attorney, Agent, or Firm* — Law Office of R. Alan Burnett, P.S.

(57) ABSTRACT

Processor instructions for determining two minimum and two maximum values and associated apparatus and methods. The instructions include various 2MIN instructions for determining the two smallest values among three or four input values and 2MAX instructions for determining the two largest values among three or four input values. The 2MIN instructions employ two operands, with the first operand in some of the variations storing concatenated min1 and min2 values in a first register and a scr2 comparison value or two src2 concatenated src2 values in a second register. Comparators are used to implement hardware logic for determining whether the scr2 value(s) is/are less than each of min1 and min2. Based on the hardware logic, the smallest two values among min1, min2, and src2 (or both src2 values) are stored as concatenated values in the first register. The 2MAX instructions are implemented in a similar manner, except the comparisons are whether the scr2 value(s) is/are greater than each of max1 and max2 values. 128-bit 2MIN and 2MAX SIMD instructions are also provided for processing two 64-bit data-paths in parallel.

30 Claims, 13 Drawing Sheets

(56) References Cited

U.S. PATENT DOCUMENTS

| | | | |
|---|---|---|---|
| 2002/0174325 A1 | 11/2002 | Iwanaga | |
| 2003/0188143 A1 | 10/2003 | Sheaffer | |
| 2004/0148320 A1* | 7/2004 | Zabarski | G06F 7/22 |
| | | | 708/207 |
| 2005/0125476 A1* | 6/2005 | Symes | G06F 9/30014 |
| | | | 708/524 |
| 2006/0095739 A1* | 5/2006 | Selvaggi | G06F 9/3001 |
| | | | 712/221 |
| 2009/0182990 A1 | 7/2009 | Muff et al. | |
| 2013/0080490 A1* | 3/2013 | Plondke | G06F 7/544 |
| | | | 708/207 |
| 2016/0085723 A1* | 3/2016 | Ueng | G06F 17/18 |
| | | | 708/207 |

OTHER PUBLICATIONS

Wikipedia, "Heap (Data Structure)", Available online at <https://en.wikipedia.org/wiki/Heap_(data_structure)> last modified on Feb. 8, 2017, 6 pages.

Wikipedia, "Huffman Coding", Available online at <https://en.wikipedia.org/wiki/Huffman_coding> last modified on Jan. 28, 2017, 11 pages.

Ziv et al., "A Universal Algorithm for Sequential Data Compression", IEEE Transactions on Information Theory, vol. 23, No. 3, May 1977, pp. 337-343.

Extended European Search Report received for European Patent Application No. 17202658.5, dated May 16, 2018, 8 pages.

\* cited by examiner

PROCESSOR INSTRUCTIONS FOR DETERMINING TWO MINIMUM AND TWO MAXIMUM VALUES

BACKGROUND INFORMATION

Huffman codes (https://en.wikipedia.org/wiki/Huffman_coding) are variable length codes that represent a set of symbols with the goal of minimizing the total number of bits needed to represent a stream of symbols. They achieve this by assigning shorter length codes to symbols that occur more frequently, and longer codes to the rarer symbols.

One example of use of Huffman codes is in the "DEFLATE" compression algorithm, which forms the basis for formats such as gzip and Zlib, as well as Winzip and PKZIP. The DEFLATE data format consists of a series of blocks, compressed using a combination of the LZ77 algorithm and Huffman coding. Huffman coding is also used for other purposes, such as in JPEG, MPEG, and MP3 codecs.

The generation of Huffman codes, at least within the context of DEFLATE compression, consists in taking an array of histogram data (weights), where each entry is a count of the number of times that symbol or token appears in the output, and then computing a corresponding code length for that token that minimizes the dot-product of the weights and the token-lengths. Typically, the sum of the weights is guaranteed to be less than 64 k, so the weights can be stored as 16-bit integers. The time needed to compute the codes is a function of how many non-zero weights there are. In DEFLATE, there are up to 30 values for the distance codes (the D-tree), but there are up to 286 values for the Literal-Length codes (the LL-tree), so in general the time for the LL-tree generation is largest.

The classical way to compute Huffman codes uses a heap data structure (https://en.wikipedia.org/wiki/Heap_(data_structure)). This is fairly efficient, but traditional software implementations contain lots of branches that are data-dependent and thus hard for general-purpose CPU hardware to predict. On modern processors with deep pipelines or super-scalar execution, the cost of these branch mispredicts can become the performance limiter.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
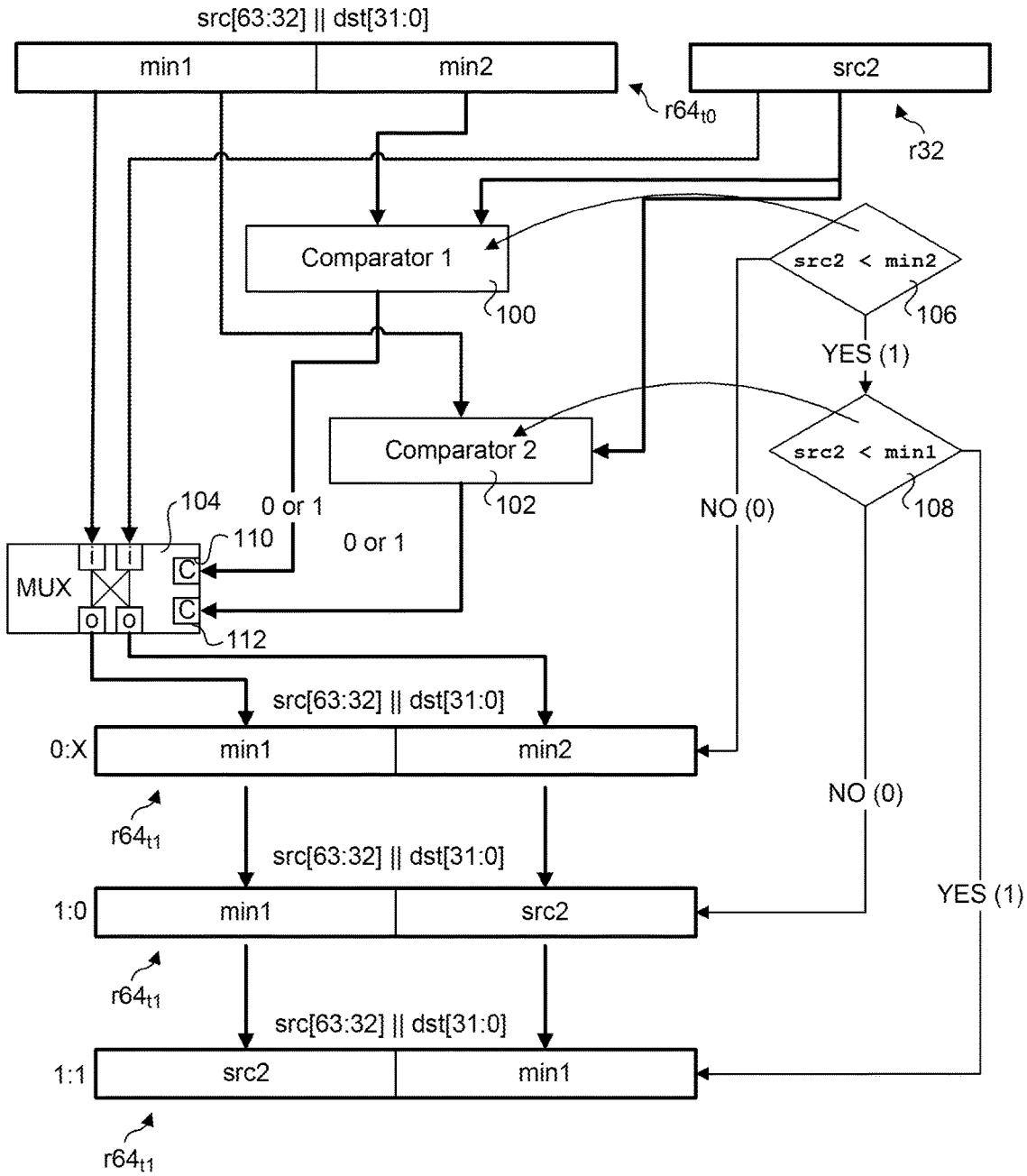
FIG. 1 is a schematic diagram illustrating a hardware-based implementation of a Compute-2MIN-v1 r64 srcdst, r32 src2 instruction used to return the smallest two values in order among three input values, according to one embodiment.

Embodiments of processor instructions for determining two minimum and two maximum values and associated apparatus and methods are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The basic Huffman algorithm can be summarized as:
1. Insert the entries with non-zero weights into the heap array.
2. Add in extra elements (each with weight 1) until the heap has at least two elements.
3. Convert the array into a heap.
4. While there is more than one element in the heap:
   a. Remove two elements from the heap (the ones with the two smallest weights).
   b. Create a new element that is the parent of these elements.
   c. Add that new element to the heap.
5. Compute the code length of each element as its depth in the tree.
6. If the max code length is too big, adjust the tree so that its depth is within limits.
7. Generate the code values from the lengths.

The main step in 4.a, requires finding the two smallest elements in a set. Structures like the Heap keep the data organized in a way that makes it easy to access the min element; however additions/deletions and updating the heap require traversing the data structure and performing operations that are not well predicted as they tend to be very data-dependent.

Instead, we simply keep the list of elements unsorted as an array. This means that at each step (4.a) we would need to find the two smallest elements in an unsorted array. While this requires more operations, the operations are well-predicted and not data dependent, as would be the case with heaps or other sorted structures.

We therefore define an instruction that can find the two smallest elements in an array of elements. Current instructions only have support to find the minimum element of a set, implying two passes and minimum computations at each step to find the two smallest elements.

Instructions for Computing Two Minimum Values

In most of the applications, the weights for the symbols can fit in a 16-bit integer. To enable including other bit-fields along with the weight, we can assume that each element is 32-bit wide. Assuming 64-bit scalar instructions, we can define a 64-bit register that holds a pair of 32-bit elements: min1||min2. These are the two smallest elements found so far. As we iterate over the next elements in a list, the two min elements get updated, if applicable.

LISTING 1 shows pseudocode for a first instruction Compute-2MIN-v1 that may be executed iteratively to return the two smallest elements in a set or an array.

LISTING 1

```
1      // assume min1 <= min2
2      Compute-2MIN-v1 r64 srcdst, r32 src2{
3          min1||min2 = srcdst;
4          if (src2 < min2){
5              if (src2 < min1) srcdst = src2||min1;
6              else srcdst = min1||src2;
7          }
8      }
```

As shown in FIG. 1, the three parameters min1, min2, and src2 for a software function associated with the instruction are stored in two registers. The first register, r64, is a 64-bit register that stores the source (src) and destination (dst) parameter values. When the instruction is called, previously concatenated 32-bit binary data for values min1 and min loaded into the upper (src[63:32]) and lower (dst[31:0]) 32-bit halves of 64-bit register r64. The second is a 32-bit register r32 that stores the second source parameter value (src2). FIG. 1 also shows first and second comparators 100 and 102, and a multiplexer (MUX) 104.

As further shown in FIG. 1, the logic proceeds as follows. As depicted herein, some registers have a tn subscript indicating the register state for a corresponding time, wherein t0 corresponds to an initial time, t1 corresponds to a first time following the initial time, and tn corresponds to a second time following the initial time. After the min1, min2 and src2 parameters are loaded into registers r64 and r32 at time t0, the register r64 dst[31:0] min2 parameter and register r32 src2 parameter are loaded into first comparator 100. As depicted by a decision block 106, first comparator 100 is configured to output a '1' if src2<min2 or a '0' if min2≤src2. A similar comparison operation is performed by second comparator 102, which compares the register r64 src[63:32] min2 parameter with src2. If src2<min1, second comparator 102 outputs a '1', otherwise it outputs a '0'.

If the control input 110 to MUX 104 from first comparator 100 is '0', the min1 and min2 values in register r64 will remain the same. (The MUX input from second comparator 102 is an 'X', meaning don't care.) If the control input from first comparator 100 is a '1' and the control input 112 from second comparator 102 is a '0', src2 will be copied into the second 32 bits (dst[31:0]) of register r64, replacing min2. If the control input 110 from first comparator 100 is a '1' and the control input 112 from second comparator 102 is a '1', then min1 will be copied from the first 32 bits (src[63:32]) of register r64 to the second 32 bits (dst[31:0]) of register r64, and scr2 will be copied into the first 32 bits of register r64, replacing min2. The Compute-2MIN-v1 r64 srcdst, r32 src2 instruction then returns the 64-bit value in register r64, which will represent the two minimum values, in order, of the three input parameters min1, min2, and src2.

In addition to being implemented in hardware log using comparators, MUXes, etc., instruction Compute-2MIN-v1 may be implemented using microcode that is part of the processor's instruction set architecture (ISA). Under this approach, the logic depicted by the pseudocode in LISTING 1 is implemented via corresponding microcode instructions. As another alternative, instruction Compute-2MIN-v1 may be implemented via a combination of hardware logic and microcode.

LISTING 2 shows pseudocode for a second instruction Compute-2MIN-v2 that may be executed iteratively to return the two smallest elements in a set or an array. In this embodiment, src2 is extended to contain 2 new array elements.

LISTING 2

```
1    // assume min1 <= min2
2    // Extending src2 to 64-bit containing 2 new array elements:
3    Compute-2MIN-v2 r64 srcdst, r64 src2{
4        min1||min2 = srcdst;
5        el1 = src2[31:0];
6        if (el1 < min2){
7            if (el1 < min1) srcdst = el1||min1;
8            else srcdst = min1||el1;
9        }
10       min1 = srcdst[63:32];
11       min2 = srcdst[31:0];
12       el2 = src2[63:32];
13       if (el2 < min2){
14           if (el2 < min1) srcdst = el2||min1;
15           else srcdst = min1||el2;
16       }
17   }
```

Figure 2:
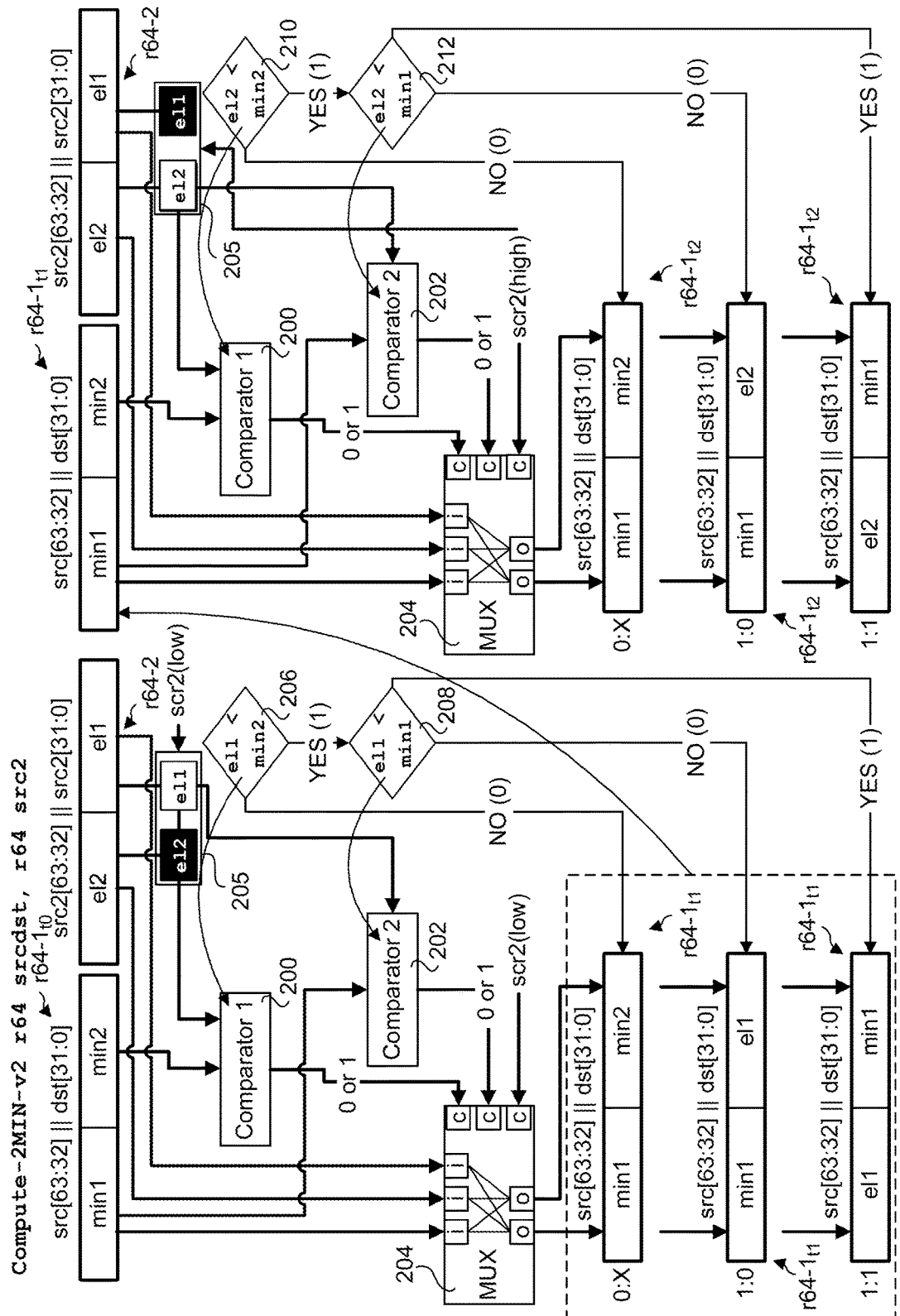
FIG. 2 is a schematic diagram illustrating a hardware-based implementation of a Compute-2MIN-v2 r64 srcdst, r64 src2 instruction used to return the smallest two values in order among four input values, according to one embodiment.

One embodiment of a hardware components and logic for implementing instruction Compute-2MIN-v2 r64 srcdst, r64 src2 is shown in FIG. 2. The hardware components and logic include a pair of two 64-bit registers r64-1 and r64-2, first and second comparators 200 and 202, a MUX 204 and selection logic 205. FIG. 2 also shows logic decision blocks 206, 208, 210, and 212, which are used to illustrate the logical outputs of comparators 200 and 202.

The instruction logic proceeds as follows. As depicted by the r64-1$_{t0}$, r64-1$_{t1}$, and r64-1$_{t2}$ states of register r64-1, the instruction Compute-2MIN-v2 r64 srcdst, r64 src2 uses time-cascaded processes, with the first pass through the hardware logic shown on the left-hand portion of FIG. 2 and the second pass through the hardware logic shown on the right-hand portion. Initially, at time t0, the previously concatenated 32-bit min1 and min2 parameters values are loaded into register r64-1, as depicted by r64-1 register state r64-1$_{t0}$. Similarly, previously concatenated 32-bit el1 and el2 parameter values corresponding to operand src2 are loaded into register r64-2, as depicted by src2[63:32] and src2[31:0].

Next, the register r64-1 dst[31:0] min2 parameter and register r64-2 el1 32-bit parameter values are loaded into first comparator 200. Selection logic 205 is configured to select either src2[63:32] and src2[31:0] (el2 or el1) into first comparator 200, depending on whether it receives a src2 (low) (for phase 1) or src2(high) (for phase 2) input. As illustrated by decision block 206, first comparator 200 is configured to output a '1' if el1<min2 or a '0' if min2≤el1. A similar comparison operation is performed by second comparator 202, which compares the register r64-1 src[63:32] min2 parameter with el1. If el1<min1, second comparator 202 outputs a '1', otherwise it outputs a '0'.

If the input to MUX 204 from first comparator 100 is '0', the min1 and min2 values in register r64-1 will remain the same. If the input to MUX 204 from first comparator 200 is a '1' and the output from second comparator 202 is a '0', el1 will be copied into the second 32 bits (dst[31:0]) of register r64-1, replacing min2. If the output from first comparator 200 is a '1' and the output from second comparator 202 is a '1', then min1 will be copied from the first 32 bits (src[63:32]) of register r64-1 to the second 32 bits (dst[31:0]) of register r64-1, and el1 will be copied into the first 32 bits of register r64-1, replacing min2. Each of these outcomes are depicted by register r64-1 states r64-1$_{t1}$, corresponding to time t1.

The logic proceed to the top of the right-hand portion of FIG. 2 at register r64-1 state r64-1$_{t1}$. For illustrative purposes and to be consistent with LISTING 2, the parameters in register r64-1 are again depicted as min1 and min2. However, these may or may not be the same min1 and min2 values as shown in register r64-1 state r64-1$_{t0}$, depending on whether el1 is less than min1 or min2; rather, min1 and min2 represent whatever data is contained in register r64-1 at state r64-1$_{t1}$.

In a manner similar to that described for the left-hand portion of FIG. 2, the logic proceeds by loading the register r64-1 dst[31:0] min2 parameter and register r64-2 src2[63:32] el2 32-bit parameter values into first comparator 200, wherein el2 is selected by selection logic 205 via a src2 (high) input. As illustrated by decision block 212, first comparator 200 is configured to output a '1' if el2<min2 or a '0' if min2≤el2. A similar comparison operation is performed by second comparator 202, which compares the register r64-1 src[63:32] min2 parameter with el2. If el2<min1, second comparator 202 outputs a '1', otherwise it outputs a '0'.

If the input to MUX 204 from first comparator 200 is '0', the min1 and min2 values in register r64-1 will remain the same. If the input to MUX 204 from first comparator 200 is a '1' and the output from second comparator 202 is a '0', el2 will be copied into the second 32 bits (dst[31:0]) of register r64-1, replacing min2. If the output from first comparator 200 is a '1' and the output from second comparator 202 is a '1', then min1 will be copied from the first 32 bits (src[63:32]) of register r64-1 to the second 32 bits (dst[31:0]) of register r64-1, and el2 will be copied into the first 32 bits of register r64-1, replacing min2. Each of these outcomes are depicted by register r64-1 states r64-1$_{t2}$, corresponding to time t2. The Compute-2MIN-v2 r64 srcdst, r64 src2 instruction then returns the 64-bit value in register r64-1, which will represent the two minimum values, in order, of the four input parameters min1, min2, and the two new concatenated src2 parameters el1 and el2.

As with instruction Compute-2MIN-v1 r64 srcdst, r32 src2, the Compute-2MIN-v2 r64 srcdst, r64 src2 instruction can also be implemented using microcode instructions provided via the processor ISA, or using a combination of hardware logic and microcode instructions.

Another way to define a 2MIN instruction is to not assume any ordering between min1 and min2, just that they are the two smallest elements so far. An arithmetic flag (condition code) such as the carry flag (CF) points to the min element; e.g. CF=1 means min1 is the smaller element, else min2 is the smaller element. The instruction will also set the CF accordingly based on the order among the two min elements (min1 and min2); in some cases, this instruction can permit more efficient circuit implementations. One embodiment of a 2MIN instruction Compute-2MIN-v3 r64 srcdst, r32 src2 using this approach is shown in LISTING 3 below.

LISTING 3

```
1    // min1 and min2 are the 2 smallest elements but not
         ordered.
2    // CF denotes the ordering
3    Compute-2MIN-v3 r64 srcdst, r32 src2{
4        min1||min2 = srcdst; // concatenation of min1 & min2
5        p1 = (src2 < min1); // Boolean value
6        p2 = (src2 < min2); // Boolean value
7        if (p1 OR p2) { // src2 should be included now
8            if (CF)      { srcdst = min1||src2; CF = !p1;}
9            else         { srcdst = src2||min2; CF = p2;}
10       }
11   }
```

As shown in line 4, concatenated min1 and min2 parameters are loaded as the srcdst operand into the 64-bit register r64, wherein min1 occupies the upper 32-bits of register r64 and min2 occupies the lower 32-bits of register r64. The second operand is the 32-bit src2, which is loaded into the 32-bit register r32.

Next, in lines 5 and 6 two Boolean values p1 and p2 are output based on whether src2 is less that min1 (upper 32-bits of register r64) and min2 (lower 32-bits of register r64). In one embodiment, a comparator is used to determine the Boolean p1 and p2 outputs. In another embodiments, a two comparators are used, enable p1 and p2 to be determined in parallel.

As shown in line 7, if either of p1 or p2 is True (i.e., logical '1'), src2 should be included as one of the two minimum values. In lines 8 and 9 the Carry Flag (CF) is used to determine whether min1 or min2 will be replaced by src2 in the srcdst operand in register r64. If both p1 and p2 are False (i.e., logical '0'), neither min1 or min2 is replaced by src2.

Figure 3:
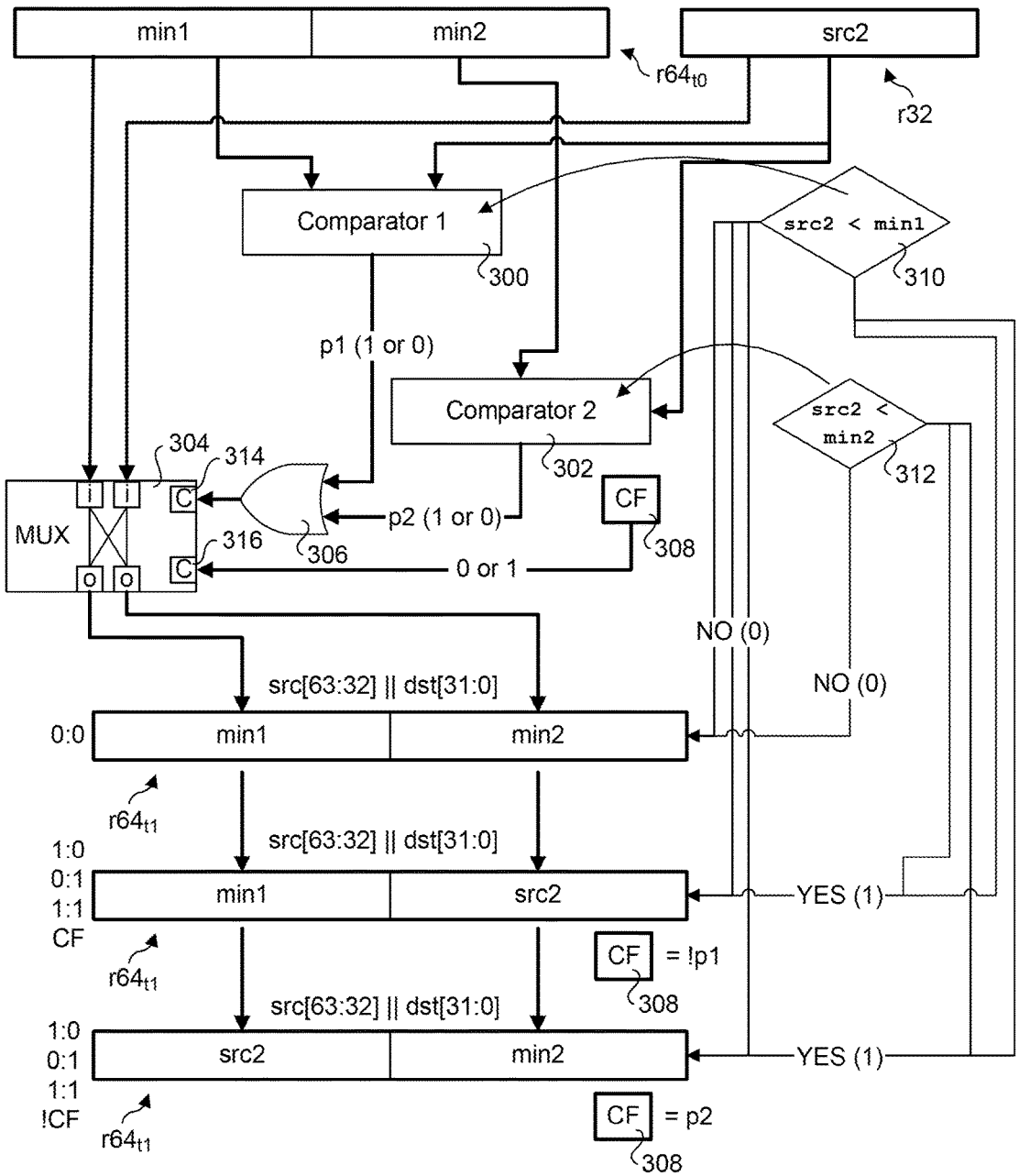
FIG. 3 is a schematic diagram illustrating a hardware-based implementation of a Compute-2MIN-v3 r64 srcdst, r32 src2 instruction used to return the smallest two values (unordered) among four input values, according to one embodiment.

As before, the Compute-2MIN-v3 r64 srcdst, r32 src2 instruction may be implemented using hardware, microcode instructions, or a combination of the two. FIG. 3 shows one embodiment of a hardware implementation of the Compute-2MIN-v3 r64 srcdst, r32 src2 instruction. The hardware circuitry includes a 64-bit registers r64, a 32-bit register r32, first and second comparators 300 and 302, a MUX 304, an OR gate 306, and a carry flag (CF) 308. FIG. 3 further shows decision blocks 310 and 312, which depict the logic implemented by comparators 300 and 302, respectively.

As before, min1 and min2 occupy the upper and lower 32-bits of the srcdst register r64, while src2 is loaded into register r32. Comparator 300 receives min1 and src2 as inputs and outputs a p1 value of '1' if src2<min1, otherwise it outputs a p1 value of '0'. Similarly, Comparator 302 receives min2 and src2 as inputs and outputs a p2 value of '1' if src2<min2, otherwise it outputs a p2 value of '0'. The p1 and p2 values are inputs to OR gate 306, which performs a logical OR function, outputting a 0 if both p1 and p2 are '0,', otherwise outputting a '1' for p1:p2 values 1:0, 0:1, or 1:1. The output of OR gate 306 is received at a control input 314 on MUX 304. CF 308 provides the second control input 316 of MUX 304.

As shown at time t1, if src2 is greater or equal to both min1 and min2, p1 and p2 will both be '0' and the data in srcdst register r64 will remain unchanged. Otherwise, if p1 and/or p2 is '1', either min1 or min2 will be replaced by src2, depending on the value of CF. The value of CF will be a '1' or '0' at time t0. If CF='1' at t0, min2 will be replaced by src2 and the value of CF will be set so that is it not p1 (!p1). If CF='0', min1 will be replaced by src2, and the value of CF will be set so that it is equal to p2.

Instructions for Computing Two Maximum Values

In addition to instructions that return two minimum values, instructions having similar logic may be implemented to return two maximum values. For example, such instructions may be used to determine the largest two values in an array or the like by iterating through the array to compare each array element with the current two maximum values in the srcdst register.

LISTING 4 shows pseudocode for a first instruction Compute-2MAX-v1 that may be executed iteratively to return the two largest elements in a set or an array.

| | LISTING 4 |
|---|---|
| 1 | // assume max1 >= max2 |
| 2 | Compute-2MAX-v1 r64 srcdst, r32 src2{ |
| 3 | max1\|\|max2 = srcdst; |
| 4 | if (src2 > max2){ |
| 5 | if (src2 > max1) srcdst = src2 \|\| max1; |
| 6 | else srcdst = max1 \|\|src2; |
| 7 | } |
| 8 | } |

Figure 1A:
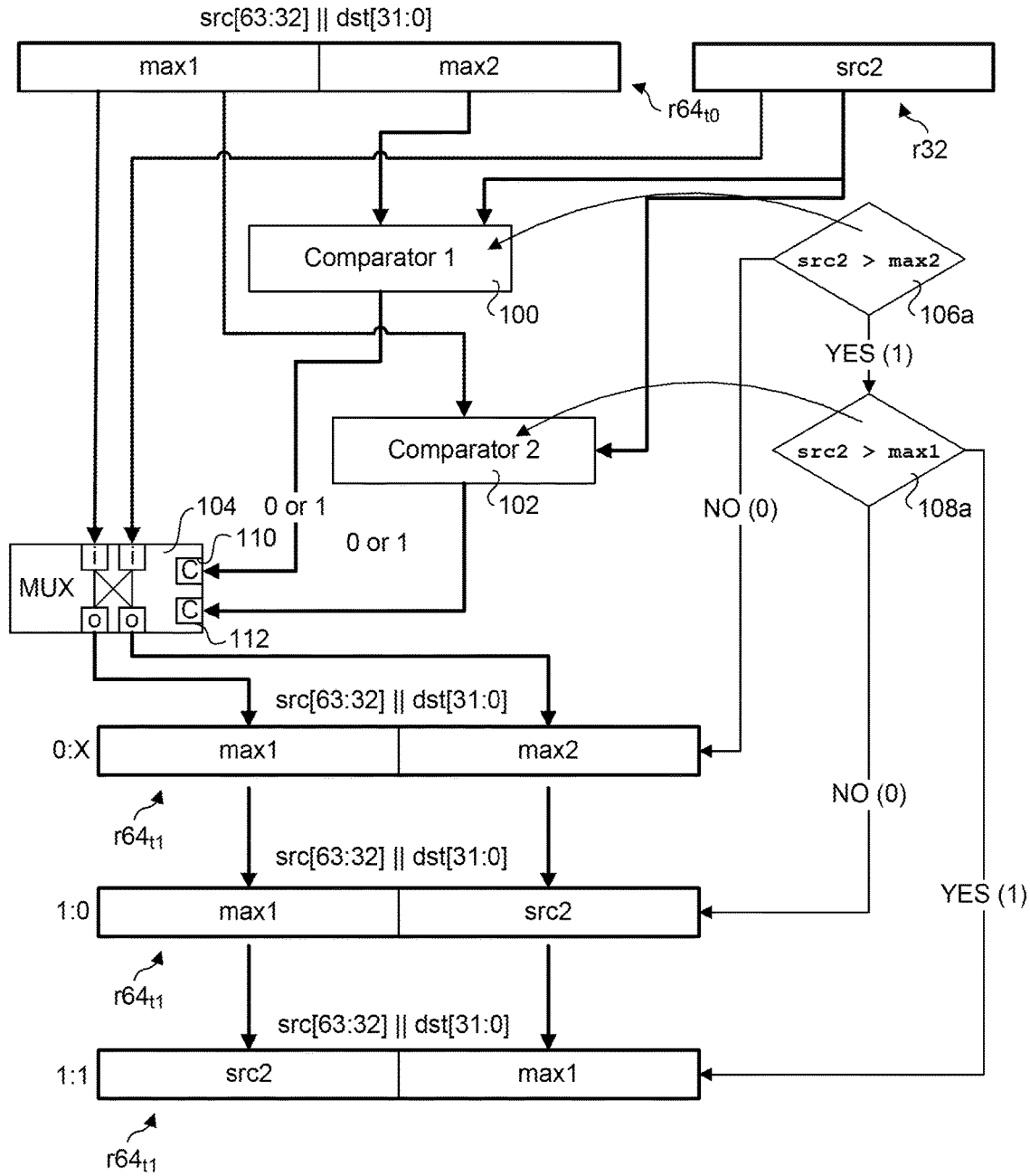
FIG. 1a is a schematic diagram illustrating a hardware-based implementation of a Compute-2MAX-v1 r64 srcdst, r32 src2 instruction used to return the largest two in order values among three input values, according to one embodiment.

The logic for implementing instruction Compute-2MAX-v1 is similar to the logic for implementing Compute-2MAX-v1, except min1 and min2 are replaced with max1 and max2, and the comparisons with src2 are greater than rather than less than. This comparison logic is illustrated in decision blocks 106a and 108a of FIG. 1a. In a manner similar to shown in FIG. 1 and discussed above, max1 and max2 are loaded into the upper and lower 32-bit halves [63:32] and [31:0] of srcdst register r64, which src2 is loaded into register r32. First comparator 100 receives max2 and src2 as inputs and outputs a '1' if src2>max2, otherwise outputs a '0'. Second comparator 102 receives max1 and src2 as inputs and outputs a '1' if src2>max1, otherwise outputs a '0'. The values in srcdst register r64 at time t1 are shown in the lower portion of FIG. 1a as a function of the MUX control inputs 110 and 112 received as outputs of first comparator 100 and second comparator 102, respectively.

LISTING 5 shows pseudocode for a second instruction Compute-2MAX-v2 that may be executed iteratively to return the two largest elements in a set or an array. In this embodiment, src2 is extended to contain 2 new array elements.

| | LISTING 5 |
|---|---|
| 1 | // assume max1 >= max2 |
| 2 | // Extending src2 to 64-bit containing 2 new array elements: |
| 3 | Compute-2MAX-v2 r64 srcdst, r64 src2{ |
| 4 | max1\|\|max2 = srcdst; |
| 5 | el1 = src2[31:0]; |
| 6 | if (el1 < max2){ |
| 7 | if (el1 < max1) srcdst = el1\|\|max1; |
| 8 | else srcdst = max1\|\|el1; |
| 9 | } |
| 10 | max1 = srcdst[63:32]; |
| 11 | max2 = srcdst[31:0]; |
| 12 | el2 = src2[63:32]; |
| 13 | if (el2 < max2){ |
| 14 | if (el2 < max1) srcdst = el2\|\|max1; |
| 15 | else srcdst = max1\|\|el2; |
| 16 | } |
| 17 | } |

Figure 2A:
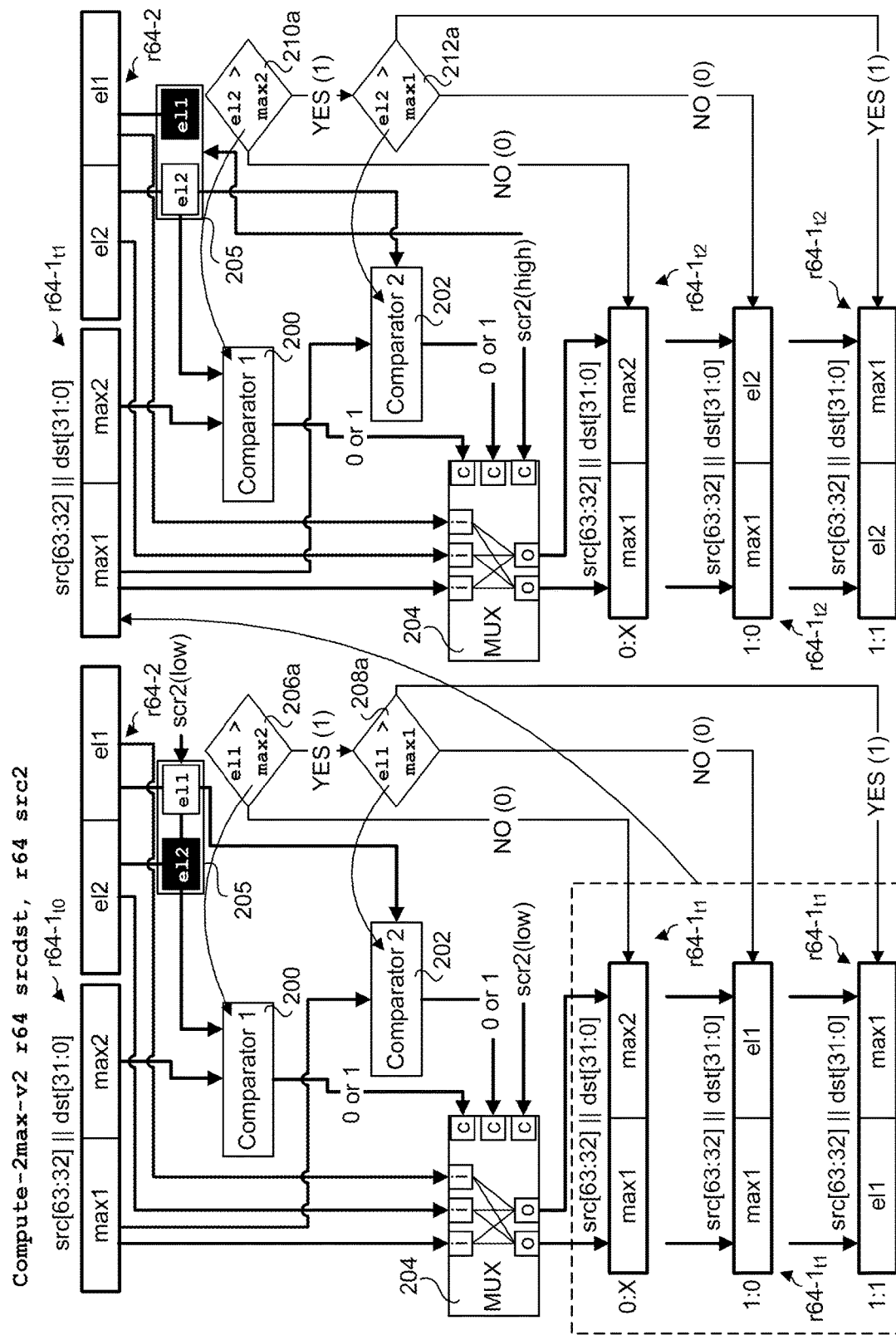
FIG. 2a is a schematic diagram illustrating a hardware-based implementation of a Compute-2MAX-v2 r64 srcdst, r64 src2 instruction used to return the smallest two values among in order four input values, according to one embodiment.

One embodiment of a hardware components and logic for implementing instruction Compute-2MAX-v2 r64 srcdst, r64 src2 is shown in FIG. 2a. The hardware components and logic are similar to those shown in FIG. 2 for instruction Compute-2MAX-v2 r64 srcdst, r64 src2 where like-numbered components perform similar functions. The differences are the min1 and min2 have been respectively replaced with max1 and max2, and decision blocks 206, 208, 210, and 212 of FIG. 2 have been replaced by decision blocks 206a, 208a, 210a, and 212a, which are which are used to illustrate the logical outputs of comparators 200 and 202.

As further illustrated, in decision block 206a, a determination is made to whether el is greater than max2; if True, during time t0 comparator 200 will output a '1', which is provided as one of the control inputs to MUX 204; otherwise the control input will be a '0'. Similar logic depicted for each of decision blocks 208a (el1>max1), 210a (el2>max2 during time t1), and 212a (el2>max1 during time t1).

As with instruction Compute-2MIN-v2 r64 srcdst, r64 src2, instruction Compute-2MAX-v2 r64 srcdst, r64 src2, may also be implemented using micro-code instructions or a combination of hardware logic and microcode instructions.

One embodiment of a 2MAX instruction Compute-2MAX-v3 r64 srcdst, r32 src2 that does not consider an order of two current maximum values is shown in LISTING 6 below.

LISTING 6

```
1     // max1 and max2 are the 2 largest elements but not ordered
          in srcdst
2     // CF denotes the ordering
3     Compute-2MAX-v3 r64 srcdst, r32 src2{
4       max1||max2 = srcdst; // concatenation of max1 & max2
5       p1 = (src2 > max1); // Boolean value
6       p2 = (src2 > max2); // Boolean value
7         if (p1 OR p2) { // src2 should be included now
8           if (CF)    { srcdst = max1||src2; CF = !p1;}
9           else       { srcdst = src2||max2; CF = p2;}
10        }
11    }
```

Figure 3A:
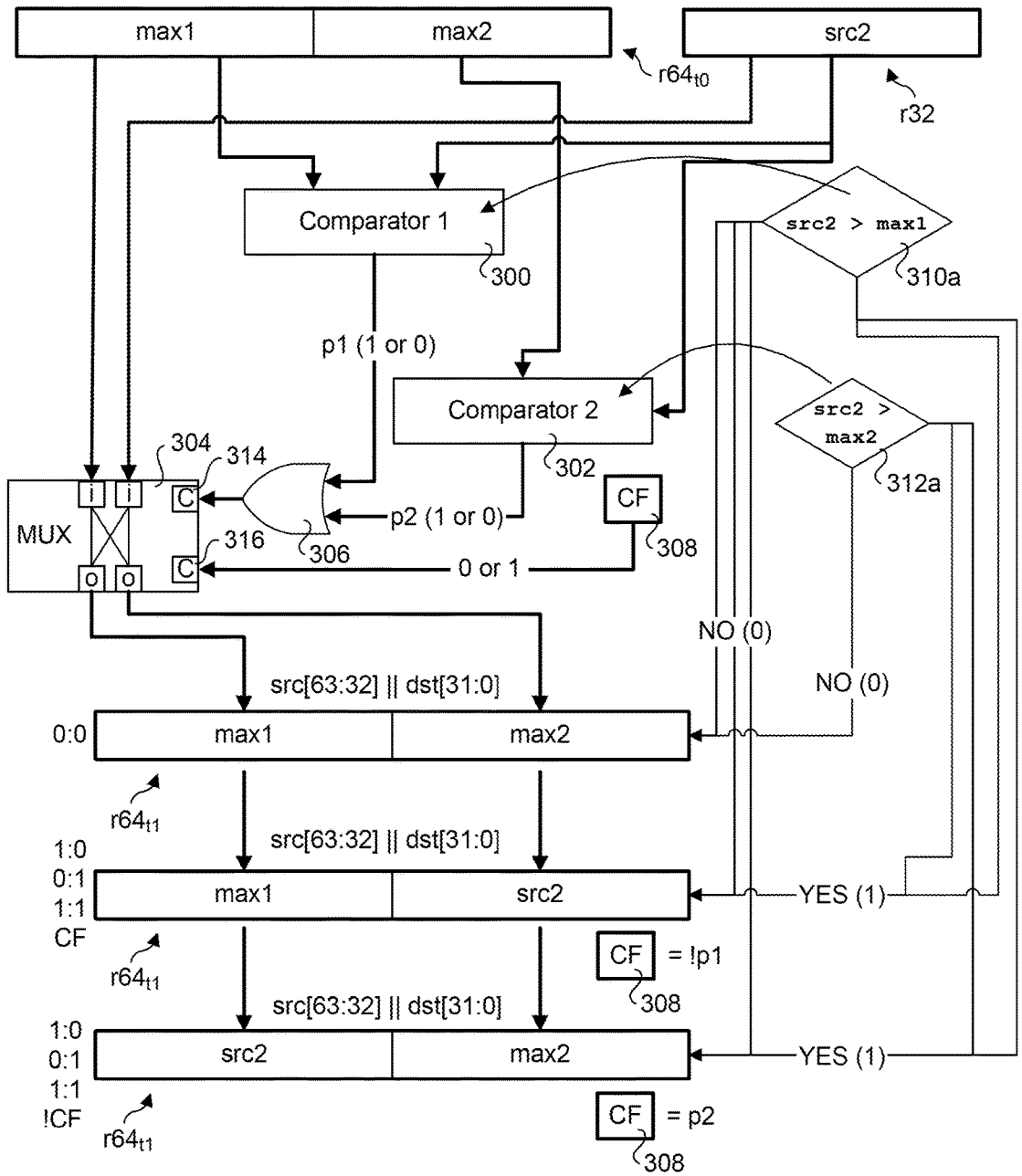
FIG. 3a is a schematic diagram illustrating a hardware-based implementation of a Compute-2MAX-v3 r64 srcdst, r32 src2 instruction used to return the smallest two values among four input values, according to one embodiment.

FIG. 3a shows one embodiment of a hardware implementation of instruction Compute-2MAX-v3 r64 srcdst, r32 src2. As indicated by like-numbered components in FIGS. 3 and 3a, the hardware components and logic for implementing instruction Compute-2MAX-v3 r64 srcdst, r32 src2 is similar to the hardware components and logic for implementing instruction Compute-2MAX-v3 r64 srcdst, r32 src2, except min1 and min2 have been replaced with max1 and max2, respectively, and decision blocks 310 and 312 have been replaced with decision blocks 310a and 312a.

Comparator 300 receives max1 and src2 as inputs, and outputs a p1 value of '1' if src2>max1, otherwise outputs a p1 value of '0', as depicted in decision block 310a. Comparator 302 receives max2 and src2 as inputs, and outputs a p2 value of '1' if src2>max2, otherwise outputs a p2 value of '0', as depicted in decision block 312a. As before, the p1 and p2 values are logically OR'ed via OR gate 306 and input to MUX control input 314, while the second MUX control input 316 is provided by CF 308.

The values of src[63:32] and dst[31:0] of srcdst register r64 are depicted at time t1 in the lower portion of FIG. 3a. If src2 is less than or equal to both max1 and max2, p1 and p2 will both be '0' and the data in srcdst register r64 will remain unchanged. Otherwise, if p1 and/or p2 is '1', either max1 or max2 will be replaced by src2, depending on the value of CF. The value of CF will be a '1' or '0' at time t0. If CF='1' at t0, max2 will be replaced by src2 and the value of CF will be set so that is it not p1 (!p1). If CF='0', max1 will be replaced by src2, and the value of CF will be set so that it is equal to p2.

2MIN and 2MAX Instruction for Arm Processor Microarchitectures

The foregoing 2MIN and 2MAX instructions may be implemented in processors employing an x86 ISA. However, this is merely exemplary and non-limiting, as variants of the foregoing instructions may be implemented on various processor architectures. For example, consider the RISC-style Arm processor. The instructions are generally capable of 3 operands. They have integer scalar instructions that work on general-purpose registers (GPRs) (e.g., 16 or 32 registers), and vector/floating-point instructions that work on 128-bit SIMD (called Neon) registers.

Figure 4:
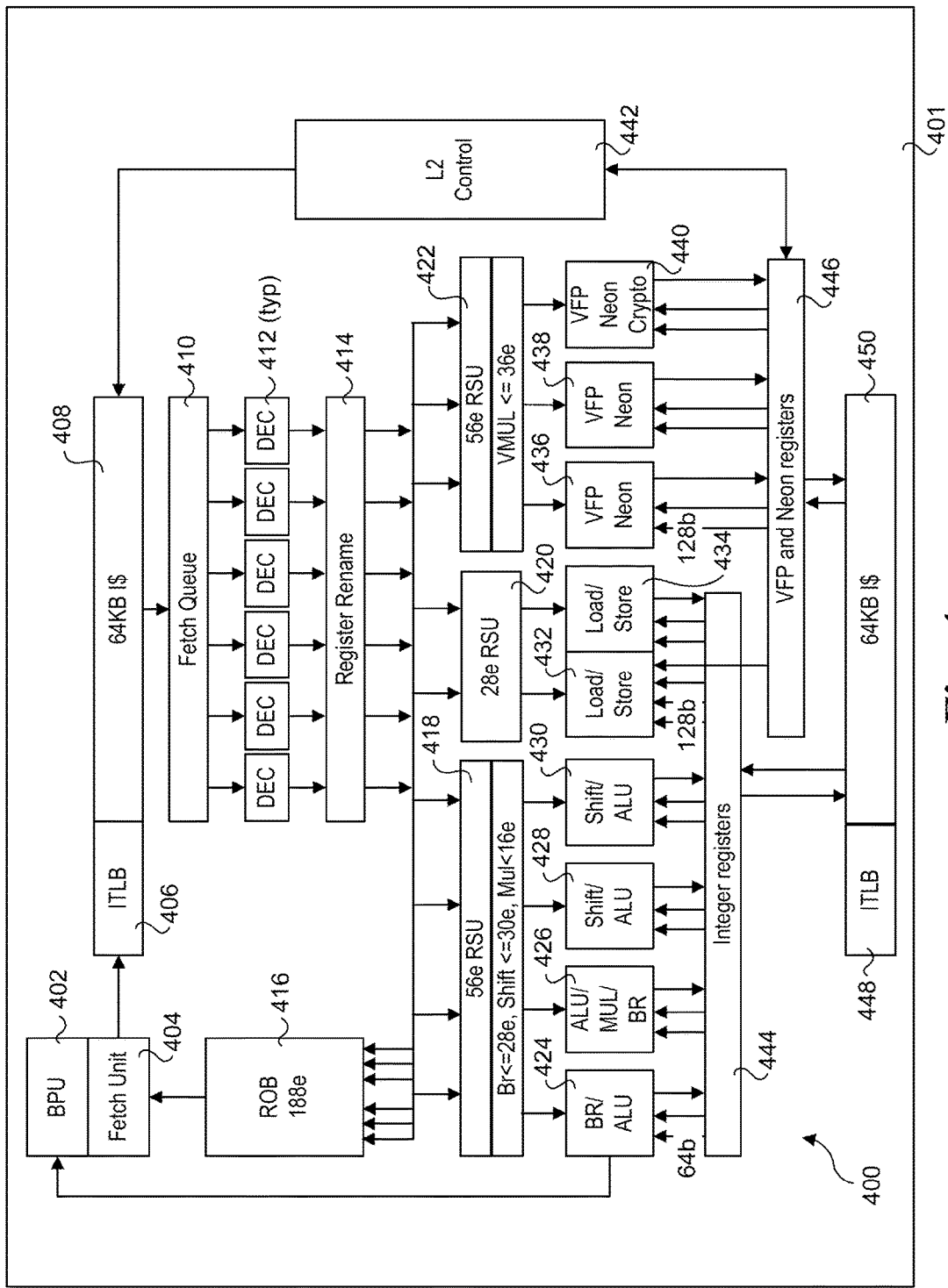
FIG. 4 is a schematic block diagram illustrating an example of an Arm-based microarchitecture.

An example of one embodiment of an Arm processor microarchitecture 400, is shown in FIG. 4. Microarchitecture 400 includes a branch prediction unit (BPU) 402, a fetch unit 404, an instruction translation look-aside buffer (ITLB) 406, a 64 KB (Kilobyte) instruction store 408, a fetch queue 410, a plurality of decoders (DECs) 412, a register rename block 414, a reorder buffer (ROB) 416, reservation station units (RSUs) 418, 420, and 422, a branch arithmetic logic unit (BR/ALU) 424, an ALU/MUL(Multiplier)/BR 426, shift/ALUs 428 and 430, and load/store blocks 432 and 434. Microarchitecture 400 further includes vector/floating-point (VFP) Neon blocks 436 and 438, and VFP Neon cryptographic block 440, an L2 control block 442, integer registers 444, 128-bit VFP and Neon registers 446, an ITLB 448, and a 64 KB instruction store 450.

LISTING 7 shows pseudocode corresponding to one embodiment of a 64-bit 2MIN instruction A64_Compute-2MIN-v1_GPR Xd, Dm implemented with a 64-bit Arm microarchitecture.

LISTING 7

```
1     // assume min1 <= min2//
2     A64_Compute-2MIN-v1_GPR Xd, Dm //64/32-bit GPR Registers {
3       min1||min2 = Xd; // concatenation of min1 & min2
4       src2 = Dm; //32-bit src2
5       if (src2 < min2)
6         if (src2 < min1) Xd = src2||min1
7         else Xd = min1||src2
8       }
9     }
```

Figure 5:
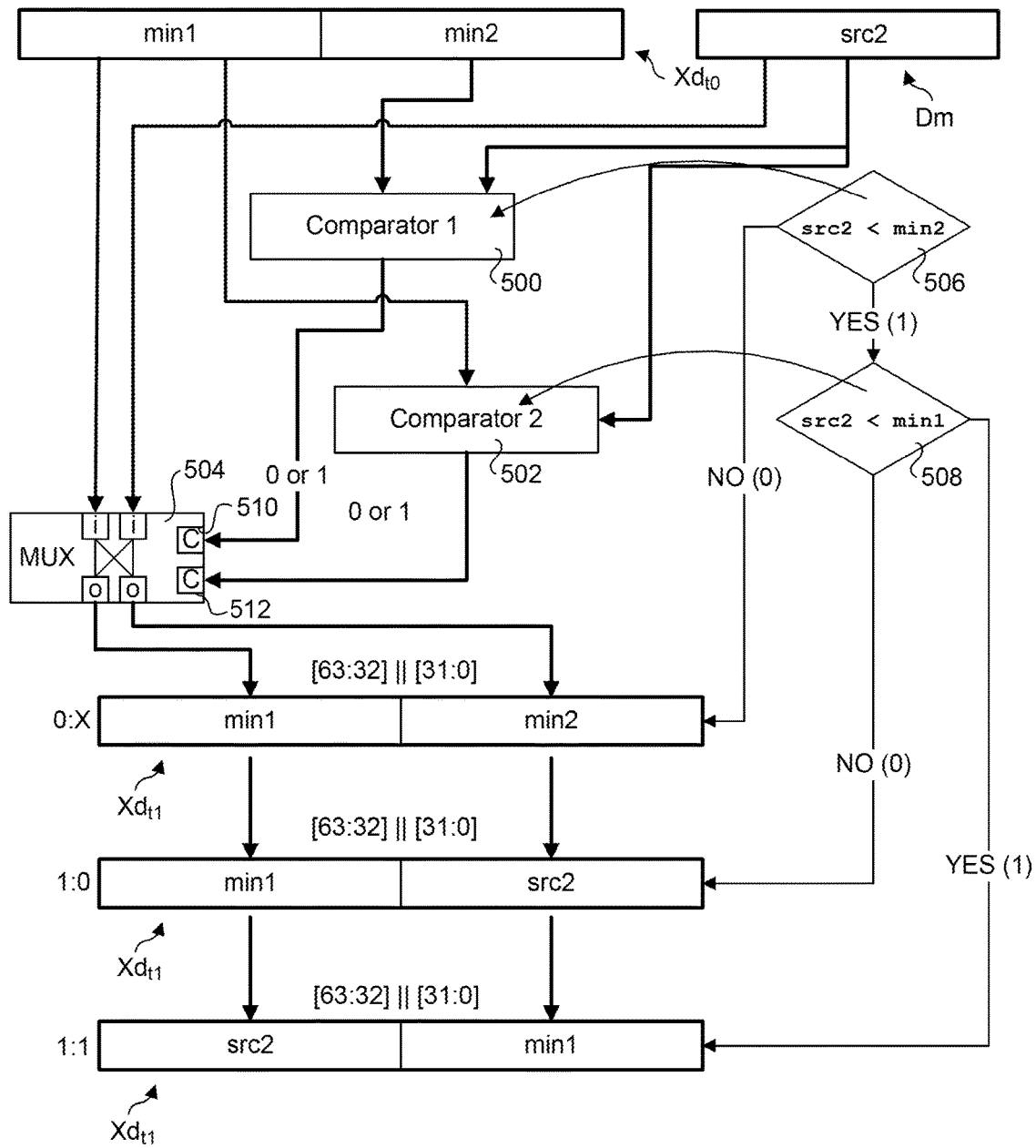
FIG. 5 is a schematic diagram illustrating a 64-bit ARM-based hardware implementation of a A64_Compute-2MIN-v1_GPR Xd, Dm instruction used to return the smallest two values in order among three input values, according to one embodiment.

FIG. 5 shows one embodiment of a hardware implementation of instruction A64_Compute-2MIN-v1_GPR Xd, Dm. The hardware components include a 64-bit GPR Xd, a 32-bit GPR Dm, first and second comparators 500 and 502 having respective outputs coupled as control inputs 510 and 512 of a MUX 504. As illustrated, a concatenation of 32-bit min1 and min2 values are loaded into 64-bit GPR Xd at time t0, while 32-bit src2 is loaded into 32-bit GPR Dm. Comparator 500 receives min2 and src2 as inputs and outputs a logical '1' if src2<min2, as depicted by a decision block 506. If src2 min2, comparator 500 outputs a '0'. Meanwhile, comparator 502 receives min1 and src2 as inputs and outputs a logical '1' if src2<min1, as depicted by a decision block 508. If src2≥min1, comparator 502 outputs a '0'.

The outputs of comparators 500 and 502 are used as the control inputs 510 and 512 of MUX 504. If the respective control inputs 510 and 512 are 0:X, the min1 and min2 values in GPR Xd remain unchanged. If the respective control inputs 510 and 512 are 1:0, min2 is replaced with src2 in GPR Xd. If the respective control inputs 510 and 512 are 1:1, min1 is replaced with src2 and min2 is replaced with min1 in GPR Xd.

LISTING 8 shows pseudocode corresponding to one embodiment of a SIMD Vector 128-bit register variant of a 2MIN instruction A64_Compute-2MIN-v1_VFP Vd.2D, Vm.2D, implemented with a 64-bit Arm microarchitecture.

LISTING 8

```
1     A64_Compute-2MIN-v1_VFP Vd.2D, Vm.2D // computes the
          above in a pair of 64-bit lanes, high and low {
2       min1||min2 = Vd[63:0];
3       src2 = Vm[31:0]; //32-bit src2
```

-continued

LISTING 8

```
4    if (src2 < min2){
5        if (src2 < min1) Vd[63:0] = src2||min1
6        else Vd[63:0] = min1||src2
7    }
8    min1||min2 = Vd[127:64];
9    src2 = Vm[95:64]; //32-bit src2
10   if (src2 < min2){
11       if (src2 < min1) Vd[127:64] = src2||min1
12       else Vd[127:64] = min1||src2
13   }
```

Figure 6:
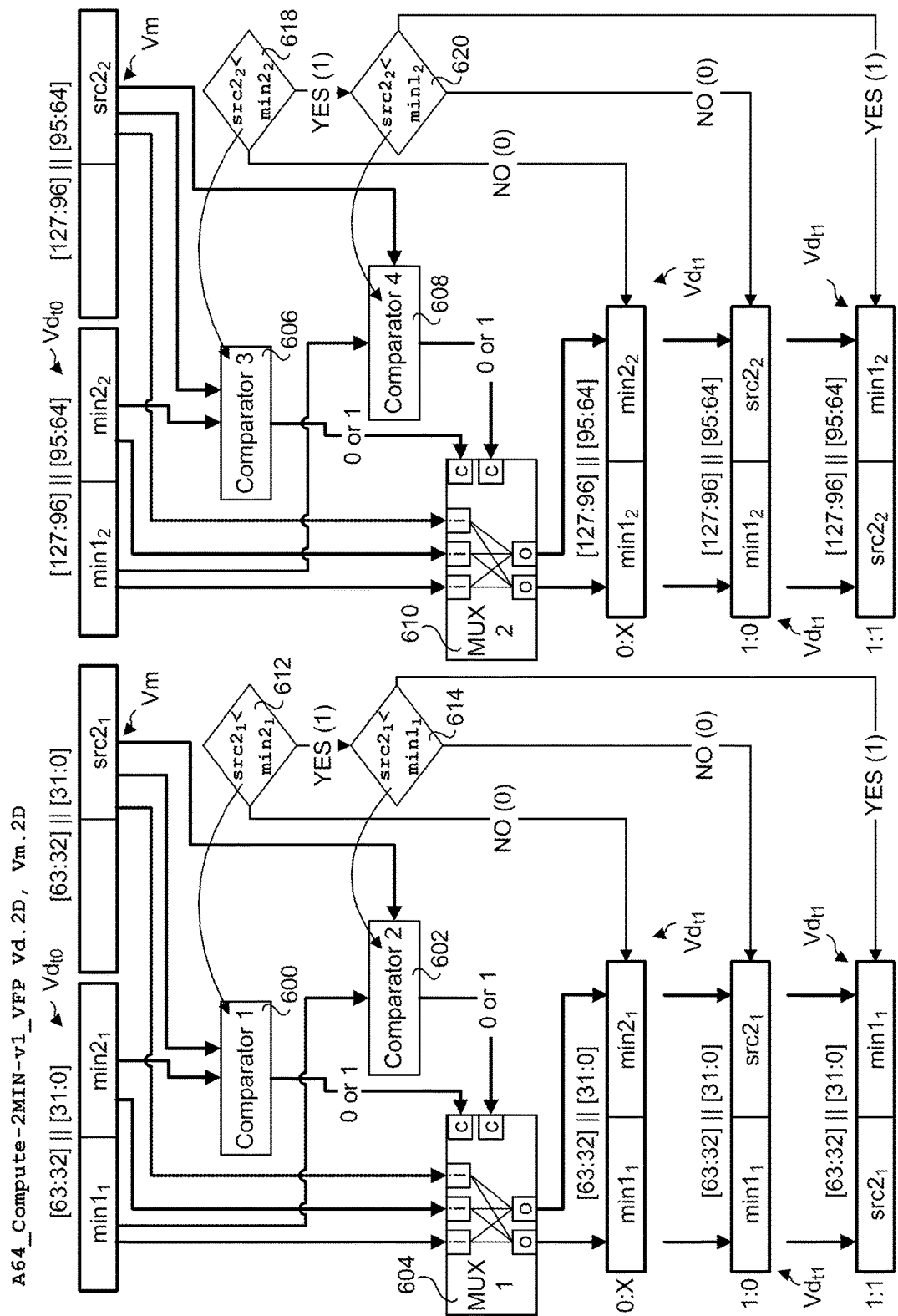
FIG. 6 is a schematic diagram illustrating a 64-bit ARM-based hardware implementation of a A64_Compute-2MIN-v1_VFP Vd.2D, Vm.2D SIMD instruction used to return the smallest two values in order among three input values for two 64-bit data-paths in parallel, according to one embodiment.

FIG. 6 shows an exemplary 64-bit ARM-based hardware implementation of a A64_Compute-2MIN-v1_VFP Vd.2D, Vm.2D SIMD instruction, according to one embodiment. The implementation is configured to return the smallest two values in order among three input values for two 64-bit data-paths in parallel. It uses logic similar to A64_Compute-2MIN-v1_GPR Xd, Dm, but operates on two 64-bit data-paths rather than one.

The hardware implementation shown in FIG. 6 includes a pair of 128-bit registers Vd and Vm. Vd is configured to store four 32-bit values corresponding to min1 and min2 input parameters for each of the two 64-bit data-paths. As shown, a first set of min1 and min2 values, labeled $min1_1$ and $min2_1$, are respectively loaded into 32-bit portions [63:32] and [31:0] of register Vd, while a second set of min1 and min2 values labeled $min1_2$ and $min2_2$, are loaded into 32-bit portions [127:96] and [95:64] of register Vd. For illustrative purposes, register Vd is split in two; however, those skilled in the art will recognize that in an actual implementation Vd is a single 128-bit register. In one embodiment, the compiler concatenates $min1_1+min2_1$ for the first data-path, and concatenates $min1_2+min2_2$ for the second data-path.

128-bit register Vm is used to store the src2 inputs for each 64-bit data-path. As shown, src2 for the first data-path, labeled $src2_1$, is loaded into 32-bit portion [31:0] of register Vm, while src2 for the second data-path, labeled $src2_2$, is loaded into 32-bit portion [95:64] of register Vm.

As shown in FIG. 6, the logic for processing min1, min2, and src2 for each of the first and second data-paths is identical and performed in parallel. The processing for the first data-path 1 is shown on the left-hand side, while the processing for second data-path 2 is shown on the right-hand side.

Processing of the first data-path proceeds as follows. $min2_1$ and $src2_1$ are loaded into a first comparator 600, while $min1_1$ and $src2_1$ are loaded into a second comparator 602. As depicted by a decision block 612, comparator 600 outputs a '1' (YES) if $src2_1<min2_1$, otherwise it outputs a '0' (NO). Similarly, and as depicted by a decision block 614, comparator 602 outputs a '1' if $src2_1<min1_1$, otherwise it outputs a '0'. The outputs of comparator 600 and 602 are provide as control inputs to a MUX 604. As shown in the lower left-hand portion of FIG. 6, if the answer to decision block 612 is NO (a '0', i.e., $src2_1 \geq min2_1$), $min1_1$ and $min2_1$ remain unchanged. If the answer to decision block 612 is YES and decision block 614 is NO, $min2_1$ is replaced with $src2_1$. If the answer to both of decision blocks 612 and 614 is YES, $min1_1$ is replaced with $src2_1$, while $min2_1$ is replaced with $min1_1$.

Processing of the second data-path proceeds as follows. $min2_2$ and $src2_2$ are loaded into a third comparator 606, while $min1_2$ and $src2_2$ are loaded into a fourth comparator 608. As depicted by a decision block 618, comparator 606 outputs a '1' (YES) if $src2_2<min2_2$, otherwise it outputs a '0' (NO). Similarly, and as depicted by a decision block 620, comparator 608 outputs a '1' if $src2_2<min1_2$, otherwise it outputs a '0'. The outputs of comparator 606 and 608 are provide as control inputs to a MUX 620. As shown in the lower right-hand portion of FIG. 6, if the answer to decision block 618 is NO, $min1_2$ and $min2_2$ remain unchanged. If the answer to decision block 618 is YES and decision block 6620 is NO, $min2_2$ is replaced with $src2_2$. If the answer to both of decision blocks 618 and 620 is YES, $min1_2$ is replaced with $src2_2$, while $min2_2$ is replaced with $min1_2$.

Figure 7:
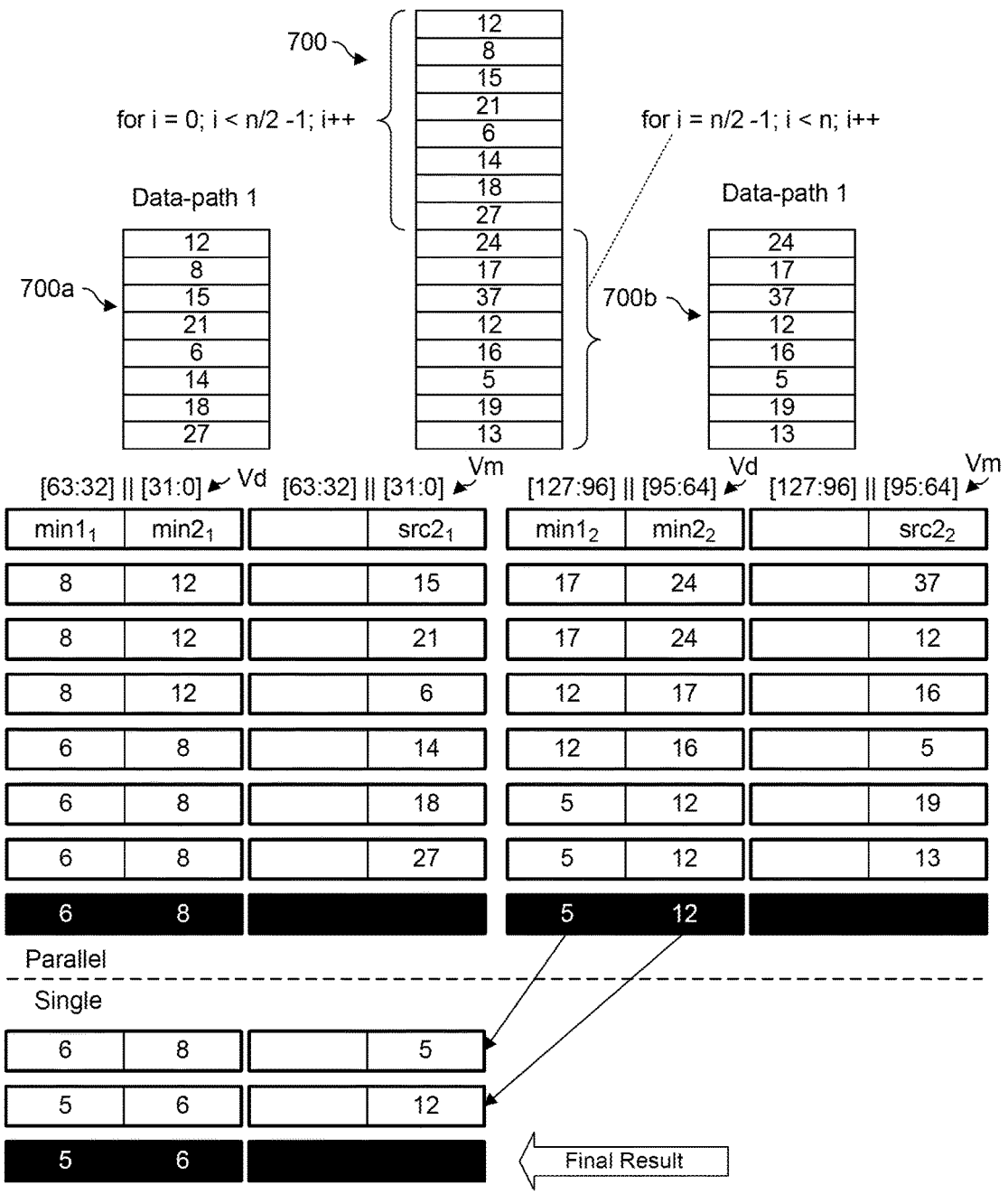
FIG. 7 is a diagram illustrating a method for determining the two smallest values in an array by processing the array elements in parallel using two 64-bit data-paths that are processed by the A64_Compute-2MIN-v1_VFP Vd.2D, Vm.2D SIMD instruction.

FIG. 7 shows parallel processing of an n element array 700 using the A64_Compute-2MIN-v1_VFP Vd.2D, Vm.2D SIMD instruction to return the smallest two values. As illustrated, the elements in array 700 are split into two subarrays 700a and 700b, each having n/2 elements. Each subarray 700a and 700b is then processed in parallel, iterating through the subarray elements until the end of the subarray is reached. As shown, at the end of processing subarray 700a, $min1_1$ and $min2_1$ are 6 and 8, while at the end of processing subarray 700b, $min1_2$ and $min2_2$ are 5 and 12.

At the point, there are four candidates for the two minimum values. As shown the parallel processing of data-paths 1 and 1 is completed, and a single data-path is used to complete the processing. In the illustrated embodiment, the A64_Compute-2MIN-v1_VFP Vd.2D, Vm.2D SIMD instruction is called twice, first loading 5 as $scr2_1$ and then loading 12 as $scr2_1$. The final result returns 5 and 6 as the two minimum values.

Figure 7A:
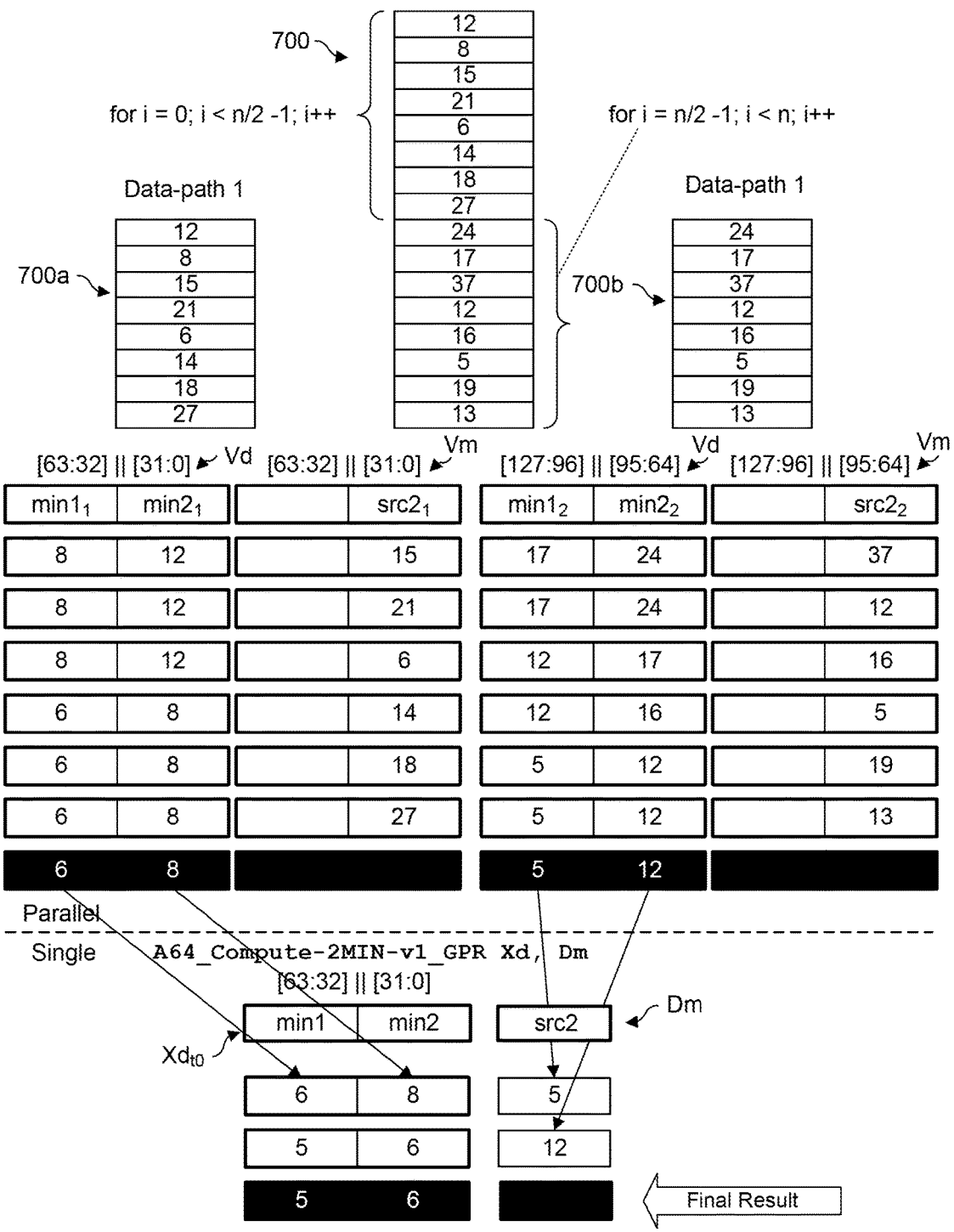
FIG. 7a is a diagram illustrating an augmentation to the method of FIG. 7 under which a A64_Compute-2MIN-v1_GPR Xd, Dm instruction is used to determine the two smallest values from among the pair of two smallest values output from the parallel processing phase.

As another option, if both the A64_Compute-2MIN-v1_VFP Vd.2D, Vm.2D SIMD instruction and the A64_Compute-2MIN-v1_GPR Xd, Dm instruction are implemented in the processor, the A64_Compute-2MIN-v1_GPR Xd, Dm can be used to perform the single path operations. This is illustrated in FIG. 7a, where after the parallel portion is completed, and two A64_Compute-2MIN-v1_GPR Xd, Dm instructions are executed, with the first instruction using $min1_1$ and $min2_1$ values 6 and 8 (concatenated) as the Xd operand value and $min1_2$ value 5 as the first src2 value and $min2_2$ value 12 as the second src2 value for the second execution of the instruction.

LISTING 9 shows pseudocode corresponding to one embodiment of a 64-bit 2MAX instruction A64_Compute-2MAX-v1_GPR Xd, Dm implemented with a 64-bit Arm microarchitecture.

LISTING 9

```
10   // assume max1 ≥ max2//
11   A64_Compute-2MAX-v1_GPR Xd, Dm //64/32-bit GPR Registers {
12       max1||max2 = Xd; // concatenation of max1 & max2
13       src2 = Dm; //32-bit src2
14       if (src2 > max2)
15           if (src2 > max1) Xd = src2||max1
16           else Xd = max1||src2
17       }
18   }
```

Figure 5A:
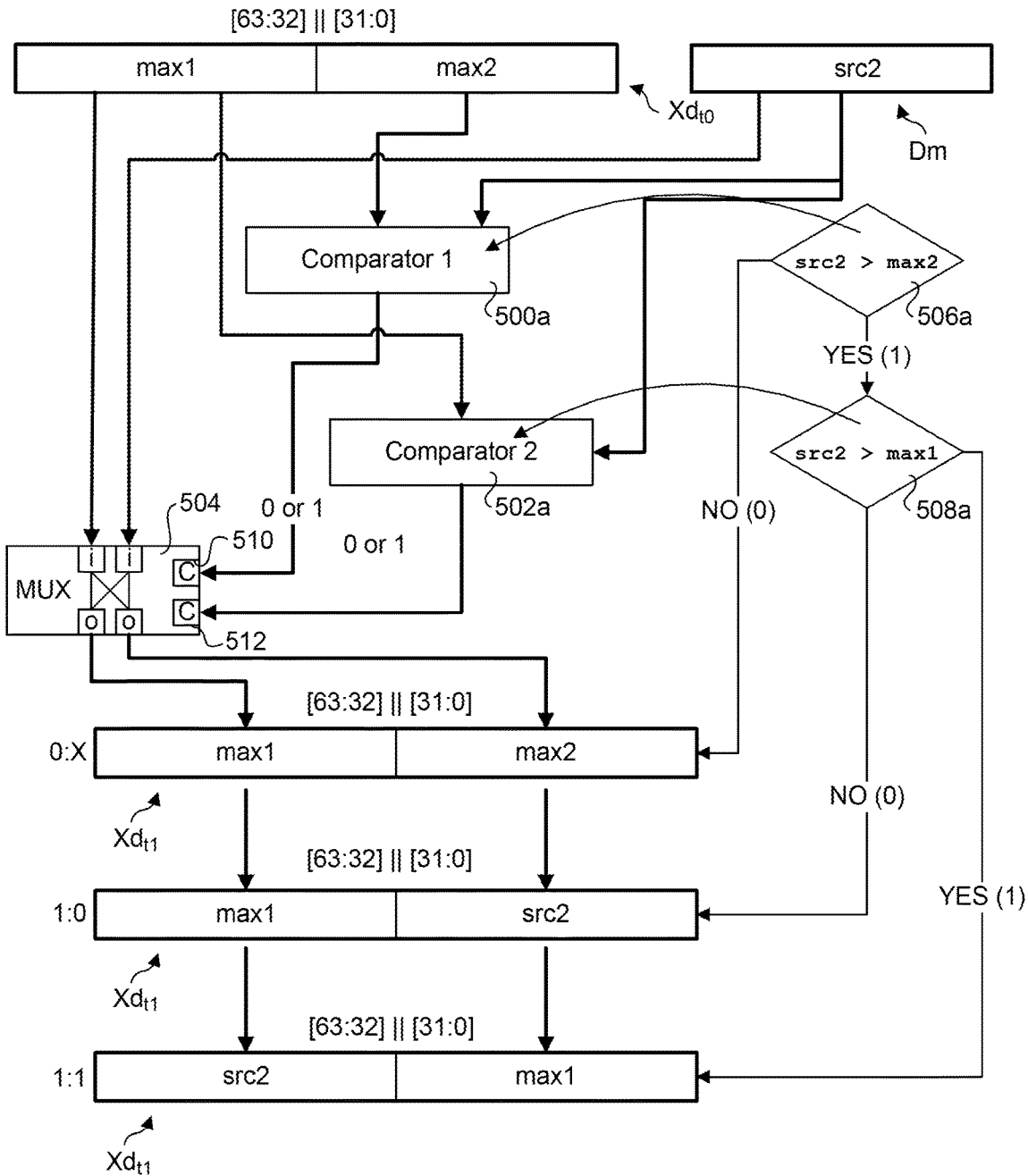
FIG. 5a is a schematic diagram illustrating a 64-bit ARM-based hardware implementation of a A64_Compute-2MAX-v1_GPR Xd, Dm instruction used to return the smallest two values in order among three input values, according to one embodiment.

FIG. 5a shows one embodiment of a hardware implementation of instruction A64_Compute-2MAX-v1_GPR Xd, Dm. The hardware components include a 64-bit GPR Xd, a 32-bit GPR Dm, first and second comparators 500a and 502a having respective outputs coupled as control inputs 510 and 512 of a MUX 504. As illustrated, a concatenation of 32-bit min1 and min2 values are loaded into 64-bit GPR Xd at time t0, while 32-bit src2 is loaded into 32-bit GPR Dm. Comparator 500*a* receives min2 and src2 as inputs and outputs a logical '1' if src2>max2, as depicted by a decision block 506*a*. If src2≤max2, comparator 500*a* outputs a '0'. Meanwhile, comparator 502*a* receives max1 and src2 as inputs and outputs a logical '1' if src2>max1, as depicted by a decision block 508*a*. If src2≤max1, comparator 502 outputs a '0'.

The outputs of comparators 500*a* and 502*a* are used as the control inputs 510 and 512 of MUX 504. If the respective control inputs 510 and 512 are 0:X, the max1 and max2 values in GPR Xd remain unchanged. If the respective control inputs 510 and 512 are 1:0, max2 is replaced with src2 in GPR Xd. If the respective control inputs 510 and 512 are 1:1, max1 is replaced with src2 and max2 is replaced with max1 in GPR Xd.

LISTING 10 shows pseudocode corresponding to one embodiment of a SIMD Vector 128-bit register variant of a 2MAX instruction A64_Compute-2MAX-v1_VFP Vd.2D, Vm.2D, implemented with a 64-bit Arm microarchitecture.

---

LISTING 10

```
1   A64_Compute-2MAX-v1_VFP Vd.2D, Vm.2D // computes the
    above in a pair of 64-bit lanes, high and low {
2     max1||max2 = Vd[63:0];
3     src2 = Vm[31:0]; //32-bit src2
4     if (src2 > max2){
5       if (src2 > max1) Vd[63:0] = src2||max1
6       else Vd[63:0] = max1||src2
7     }
8     max1||max2 = Vd[127:64];
9     src2 = Vm[95:64]; //32-bit src2
10    if (src2 > max2){
11      if (src2 > max1) Vd[127:64] = src2||max1
12      else Vd[127:64] = max1||src2
13    }
```

---

Figure 6A:
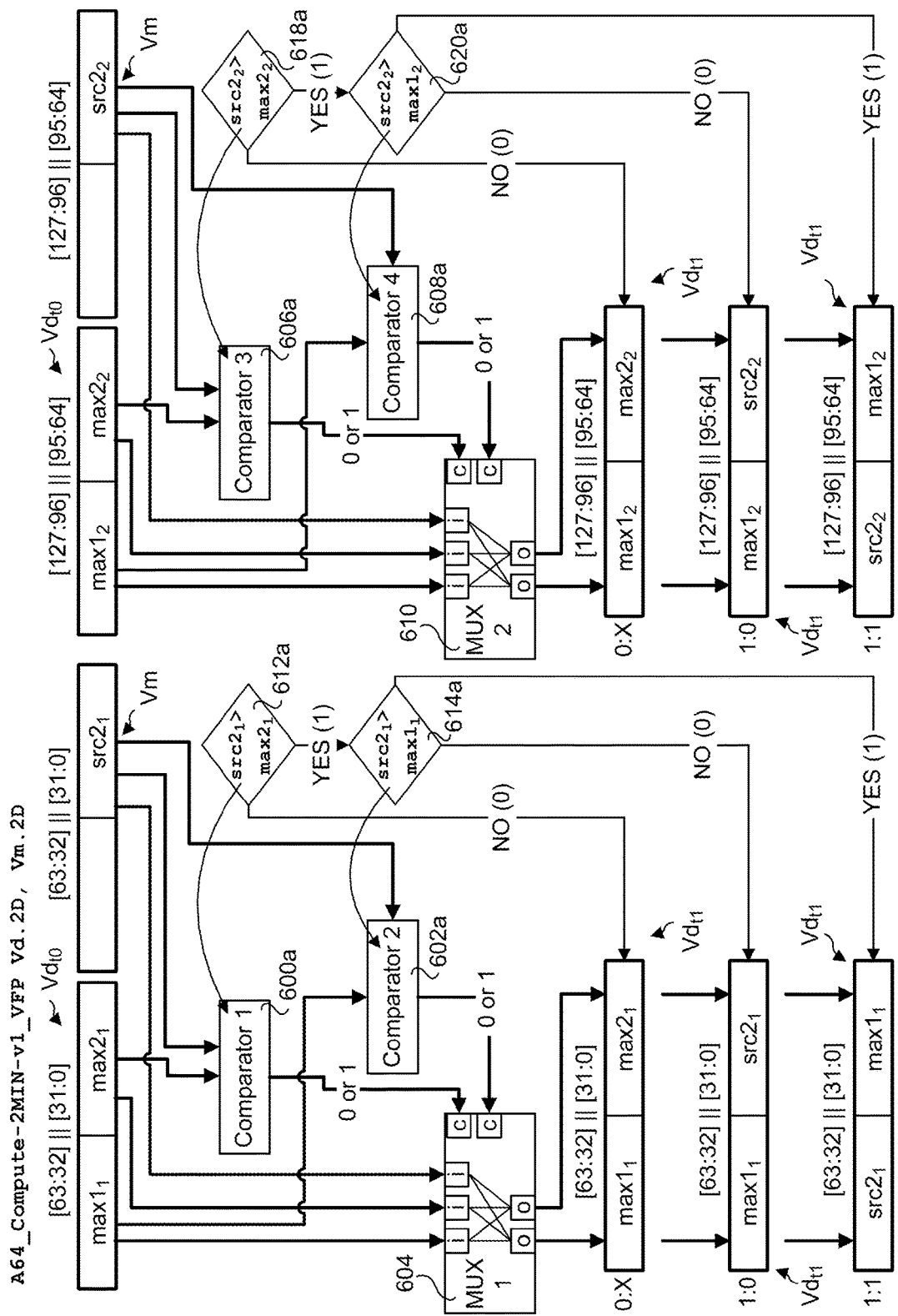
FIG. 6a is a schematic diagram illustrating a 64-bit ARM-based hardware implementation of a A64_Compute-2MAX-v1_VFP Vd.2D, Vm.2D SIMD instruction used to return the smallest two values in order among three input values for two 64-bit data-paths in parallel, according to one embodiment.

FIG. 6*a* shows an exemplary 64-bit ARM-based hardware implementation of a A64_Compute-2MAX-v1_VFP Vd.2D, Vm.2D SIMD instruction, according to one embodiment. The implementation is configured to return the two largest values in order among three input values for two 64-bit data-paths in parallel. It uses logic similar to A64_Compute-2MAX-v1_GPR Xd, Dm, but operates on two 64-bit data-paths rather than one. The overall structure is also similar to that shown in FIG. 6 for A64_Compute-2MIN-v1_VFP Vd.2D, Vm.2D, but determines $max1_1$, $max2_1$, $max1_2$ and $max2_2$ rather than $min1_1$, $min2_1$, $min1_2$ and $min2_2$.

Generally, the 2MIN2 and 2MAX instructions described herein may be implemented in an iterative, or a recursive manner to determine the two minimum values or two maximum values for a data set, such as an array or heap. For example, a 2MIN or 2MAX instruction may be called iteratively in conjunction with iterating through an array of elements or the like, under which there are three or four parameters at the application source code level (min1, min2, and src2, or min1, min2, el1, and el2.). In one embodiment, the compiler will abstract the machine code level operand mapping of the 2MIN and 2MAX instructions, wherein various parameters such as min1 and min2 will be concatenated by the compiler as the MIN2 and MAX2 operands described above. In another embodiment, the application-level source code is written such that min1 and min2 are concatenated at the source code level and passed as a single parameter (e.g., srcdst), creating a more direct mapping for the compiler between the application-level code and the machine instruction-level code.

Since a function at the application source code level generally returns a single value, either the concatenated min1 and min2 output from execution of the machine-level 2MIN instruction will be returned to the function caller or a pointer to a data structure containing min1 and min2 will be returned. For example, if the application is written in C, C++, or another language that supports pointers, the result at the application source code level may be a pointer to a data structure containing the concatenation of min1 and min2. For languages such as Java that to not support pointers, the Java source code will generally include a return value having a data structure to which the concatenation of min1 and min2 are written.

Under a recursive algorithm, the function result or output is often used as the input for the next recursive call of the function. An advantage to this approach with the 2MIN and 2MAX instructions is that an intelligent compiler in combination with a modified version of a 2MIN or 2MAX instruction could encode the machine-level instructions such that new min1 and min2 (or max1 and max2) do not need to be loaded into a register for the instruction's first operand each time the instruction is called; rather, since the new values for min1 and min2 will be the same as the returned values for min1 and min2, the modified instruction would only need to load the src2 value being used for comparison to the min1 and min2 values already in the first operand register.

Further aspects of the subject matter described herein are set out in the following numbered clauses:

1. A processor having an instruction set architecture (ISA) including a 2MIN instruction having two operands in which data parameters including first and second current minimum values and at least one comparison value are loaded during execution of the 2MIN instruction, wherein the 2MIN instruction outputs two minimum values among the first and second current minimum values and the at least one comparison value.

2. The processor of clause 1, wherein the two minimum values are output in an order.

3. The processor of clause 1 or 2, wherein the two minimum values are output unordered.

4. The processor of any of the preceding clauses, wherein the first and second current minimum values are loaded into a single register as a concatenation of the first current minimum value followed by the second minimum value.

5. The processor of any of the preceding clauses, wherein the ISA includes a plurality of microcode instructions, and wherein the 2MIN instruction is implemented, at least in part, via the use of microcode instructions from among the plurality of microcode instructions.

6. The processor of any of the preceding clauses, wherein the at least one comparison value is a first and second comparison value, and the 2MIN instruction outputs two minimum values among the first and second current minimum values and the first and second comparison values.

7. The processor of any of the preceding clauses, wherein the 2MIN instruction is implemented in hardware circuitry comprising:

a 64-bit register having upper [63:32] and lower [31:0] 32-bit portions, the 64-bit register to store a first minimum value min1 in the upper [63:32] portion and a second minimum value min2 in the lower [31:0] portion;

a 32-bit register to store a comparison value src2;

a first comparator, coupled to the 32-bit register to receive the src2 value and the lower [31:0] portion of the 64-bit register to receive the min2 value;

a second comparator, coupled to the 32-bit register to receive the src2 value and the upper [63:32] portion of the 64-bit register to receive the min1 value; and a multiplexer having a first input coupled to the upper [63:32] portion of the 64-bit register to receive the min1 value, a second input coupled to the 32-bit register to receive the src2 value, first and second control inputs respectively coupled to outputs of the first and second comparators, a first output coupled to the upper [63:32] portion of the 64-bit register and a second output coupled to the lower [31:0] portion of the 64-bit register.

8. The processor of clause 7, wherein min1≤min2, the output of the instruction is stored as a concatenation of first and second output minimum values stored in the 64-bit register, and the hardware circuit includes logic configured to:

output min1 concatenated with min2 if src2≥min2;

output min1 concatenated with src2 if src2<min2 and src2≥min2; and output src2 concatenated with min1 if src2<min2 and src2<min1.

9. The processor of any of the preceding clauses, wherein the 2MIN instruction is implemented in hardware circuitry comprising:

a 64-bit srcdst register having upper [63:32] and lower [31:0] 32-bit portions, the srcdst register to store a first minimum value min1 in the upper [63:32] portion and a second minimum value min2 in the lower [31:0] portion;

a 64-bit src2 register having upper [63:32] and lower [31:0] 32-bit portions, the src2 register to store a first comparison value el1 in lower 32-bit portion [31:0] and a second comparison value el2 in;

src2 selector logic, coupled to the second 64-bit register, to select either the upper [63:32] or lower [31:0] portions and of the src2 register;

a first comparator, coupled to the output of the src2 selector logic to receive the el1 or el2 value and coupled to the lower [31:0] portion of the 64-bit srcdst register to receive min2;

a second comparator, coupled to the output of the src2 selector logic to receive the el1 or el2 value and coupled to the upper [63:32] portion of the 64-bit srcdst register to receive the min1 value; and a multiplexer having first input coupled to the upper [63:32] portion of the 64-bit srcdst register to receive the min1, a second input coupled to the upper [63:32] portion of the src2 register to receive the el2 value, a third input coupled to the lower [31:0] portion of the src2 register to receive the el1 value, first and second control inputs respectively couple to outputs of the first and second comparators, a third control input to receive a scr2 low or scr2 high signal, a first output coupled to the upper [63:32] portion of the 64-bit srcdst register and a second output coupled to the lower [31:0] portion of the 64-bit srcdst register.

10. The processor of clause 9, wherein min1≤min2, the output of the instruction is stored as a concatenation of first and second output minimum values stored in the 64-bit srcdst register, and the hardware circuit includes logic configured to:

during a first timeframe, output min1 concatenated with min2 if el1≥min2;

output min1 concatenated with src2 if el1<min2 and el1≥min2; and output src2 concatenated with min1 if el1<min2 and el1<min1;

set min1 and min2 to correspond to the upper [63:32] portion and lower [31:0] portion of 64-bit srcdst register;

during a second timeframe;

output min1 concatenated with min2 if el2≥min2;

output min1 concatenated with src2 if el2<min2 and el2≥min2; and output src2 concatenated with min1 if el2<min2 and el2<min1;

11. The processor of any of the preceding clauses, wherein the 2MIN instruction is implemented in hardware circuitry comprising:

a 64-bit register having upper [63:32] and lower [31:0] 32-bit portions, the 64-bit register to store a first minimum value min1 in the upper [63:32] portion and a second minimum value min2 in the lower [31:0] portion;

a 32-bit register to store a comparison value src2;

a first comparator, coupled to the 32-bit register to receive the src2 value and the lower [31:0] portion of the 64-bit register to receive the min2 value;

a second comparator, coupled to the 32-bit register to receive the src2 value and the upper [63:32] portion of the 64-bit register to receive the min1 value;

a logical OR gate, coupled to an output of the first comparator and an output of the second comparator;

a carry flag (CF); and a multiplexer having a first input coupled to the upper [63:32] portion of the 64-bit register to receive the min1 value, a second input coupled to the 32-bit register to receive the src2 value, first and second control inputs respectively coupled to an output of the logical OR gate and the carry flag; a first output coupled to the upper [63:32] portion of the 64-bit register and a second output coupled to the lower [31:0] portion of the 64-bit register.

12. The processor of clause 11, wherein the output of the instruction is stored as a concatenation of first and second output minimum values stored in the 64-bit register, and the hardware circuit includes logic configured to:

output min1 concatenated with min2 if src2≥min2 and src2≥min1;

output min1 concatenated with src2 if src2 is less than at least one of min1 and min2 and the CF='0', and set the CF to not equal the output of the first comparator; and output src2 concatenated with min2 if src2 is less than at least one of min1 and min2 and the CF='1', and set the CF equal to the output of the second comparator.

13. The processor of any of the preceding clauses, wherein the processor employs an Arm-based microarchitecture, and wherein the 2MIN instruction is implemented in hardware circuitry comprising:

a 64-bit general purpose register (GPR) having upper [63:32] and lower [31:0] 32-bit portions, the 64-bit GPR to store a first minimum value min1 in the upper [63:32] portion and a second minimum value min2 in the lower [31:0] portion;

a 32-bit GPR to store a comparison value src2;

a first comparator, coupled to the 32-bit GPR to receive the src2 value and the lower [31:0] portion of the 64-bit GPR to receive the min2 value;

a second comparator, coupled to the 32-bit GPR to receive the src2 value and the upper [63:32] portion of the 64-bit GPR to receive the min1 value; and a multiplexer having a first input coupled to the upper [63:32] portion of the 64-bit GPR to receive the min1 value, a second input coupled to the 32-bit register to receive the src2 value, first and second control inputs respectively coupled to outputs of the first and second comparators, a first output coupled to the upper [63:32] portion of the 64-bit GPR and a second output coupled to the lower [31:0] portion of the 64-bit GPR.

14. The processor of clause 13, wherein min1≤min2, the output of the instruction is stored as a concatenation of first and second output minimum values stored in the 64-bit GPR, and the hardware circuit includes logic configured to:

output min1 concatenated with min2 if src2≥min2;
output min1 concatenated with src2 if src2<min2 and src2≥min2; and
output src2 concatenated with min1 if src2<min2 and src2<min1.

15. A processor having an instruction set architecture (ISA) including a 128-bit SIMD (Single Instruction Multiple Data) instruction configured, when executed, to output:

a first pair of minimum values among a first set of input values including a first pair of current minimum values and a first comparison value; and a second pair of minimum values among a second set of input values including a second pair of current minimum values and a second comparison value.

16. The processor of clause 15, wherein each of the first pair of minimum values and the second pair of minimum values are ordered.

17. The processor of clause 15 or 16, wherein the 128-bit SIMD instruction is configured to process the first and second set of input values from two 64-bit data-paths in parallel.

18. The processor of any of clauses 15-17, wherein the 128-bit SIMD instruction includes a first operand comprising a concatenation of the first pair of current minimum values and the second pair of minimum values and a second operand comprising a concatenation of the first comparison value and the second comparison value.

19. The processor of clause 18, wherein, during execution of the 128-bit SIMD instruction 128-bits of data corresponding to the first operand is loaded into a first 128-bit register as four 32-bit parameters comprising the first and second pair of minimum values, and data corresponding to the second operand are loaded into a second 128-bit register as two 32-bit parameters comprising the first and second comparison values.

20. The processor of clause 19, wherein, an output of the 128-bit SIMD instruction comprising the first pair of minimum values concatenated with the second pair of minimum values is stored in the first 128-bit register.

21. The processor of any of clauses 15-20, wherein the processor employs an Arm-based microarchitecture, and wherein the 2MIN instruction is implemented in hardware circuitry comprising:

a first 128-bit register to store first min1 and min2 values corresponding to the first pair of minimum values and to store second min1 and min2 values corresponding to the second pair of minimum values;

a second 128-bit register to store a first scr2 value corresponding to the first comparison value and a second scr2 value corresponding to the second comparison value;

a first comparator, coupled to the second 128-bit register to receive the first src2 value and the first 128-bit register to receive the first min2 value;

a second comparator, coupled to the second 128-bit register to receive the first src2 value and the first 128-bit register to receive the first min 1 value;

a first multiplexer having data inputs coupled to each of the first and second 128-bit registers and control inputs respectively coupled to outputs from the first and second comparators;

a third comparator, coupled to the second 128-bit register to receive the second src2 value and the first 128-bit register to receive the second min2 value;

a fourth comparator, coupled to the second 128-bit register to receive the second src2 value and the first 128-bit register to receive the second min 1 value;

a second multiplexer having data inputs coupled to each of the first and second 128-bit registers and control inputs respectively coupled to outputs from the third and fourth comparators.

22. The processor of clause 21, wherein hardware circuitry is configured to process data received from two 64-bit data-paths in parallel.

23. A method for determining the smallest two values in a data set having a plurality of data elements, comprising:

one of iteratively or recursively executing a 2MIN instruction in a processor instruction set architecture in conjunction with iterating through the plurality of data elements, wherein the 2MIN instruction has two operands in which data parameters including first and second current minimum values and at least one comparison value are loaded during execution of the 2MIN instruction, wherein the 2MIN instruction outputs two minimum values among the first and second current minimum values and the at least one comparison value.

24. The method of clause 23, wherein the first and second current minimum values are loaded into a single register as a concatenation of the first current minimum value followed by the second minimum value.

25. The method of clause 23 or 24, wherein the at least one comparison value is a first and second comparison value, and the 2MIN instruction outputs two minimum values among the first and second current minimum values and the first and second comparison values.

26. The method of any of clauses 23-25, wherein the processor employs an Arm-based microarchitecture, and the 2MIN instruction includes two operands stored in a 64-bit General Purpose Register (GPR) and a 32-bit GPR during execution of the 2MIN instruction.

27. A method for determining the smallest two values in a data set having a plurality of data elements, comprising:

partitioning the data set into first and second halves of the data set;

determining a first pair of minimum values corresponding to the first half of the data set;

determining a second pair of minimum values corresponding to the second half of the data set; and determining the two smallest values among the first pair of minimum values and the second pair of minimum values, wherein the first pair and second pair of minimum values are determined in parallel by one of iteratively or recursively executing a 128-bit SIMD (Single Instruction Multiple Data) instruction in a processor instruction set in conjunction with iterating through the first and second halves of the data set.

28. The method of clause 27, wherein the two smallest values among the first pair of minimum values and the second pair of minimum values is determined using the 128-bit SIMD instruction.

29. The method of clause 27 or 28, wherein the two smallest values among the first pair of minimum values and the second pair of minimum values is determined using a 64-bit instruction included in the processor instruction set.

30. The method of any of clauses 27-29, wherein the processor employs an Arm-based microarchitecture.

31. A processor having an instruction set architecture (ISA) including a 2MAX instruction having two operands in which data parameters including first and second current maximum values and at least one comparison value are loaded during execution of the 2MAX instruction, wherein the 2MAX instruction outputs two maximum values among the first and second current maximum values and the at least one comparison value.

32. The processor of clause 31, wherein the two maximum values are output in an order.

33. The processor of clause 31 or 32, wherein the two maximum values are output unordered.

34. The processor of any of clauses 31-33, wherein the first and second current maximum values are loaded into a single register as a concatenation of the first current maximum value followed by the second maximum value.

35. The processor of any of clauses 31-34, wherein the ISA includes a plurality of microcode instructions, and wherein the 2MAX instruction is implemented, at least in part, via the use of microcode instructions from among the plurality of microcode instructions.

36. The processor of any of clauses 31-35, wherein the at least one comparison value is a first and second comparison value, and the 2MAX instruction outputs two maximum values among the first and second current maximum values and the first and second comparison values.

37. The processor of any of clauses 31-36, wherein the 2MAX instruction is implemented in hardware circuitry comprising:

a 64-bit register having upper [63:32] and lower [31:0] 32-bit portions, the 64-bit register to store a first maximum value max1 in the upper [63:32] portion and a second maximum value max2 in the lower [31:0] portion;

a 32-bit register to store a comparison value src2;

a first comparator, coupled to the 32-bit register to receive the src2 value and the lower [31:0] portion of the 64-bit register to receive the max2 value;

a second comparator, coupled to the 32-bit register to receive the src2 value and the upper [63:32] portion of the 64-bit register to receive the max1 value; and a multiplexer having a first input coupled to the upper [63:32] portion of the 64-bit register to receive the max1 value, a second input coupled to the 32-bit register to receive the src2 value, first and second control inputs respectively coupled to outputs of the first and second comparators, a first output coupled to the upper [63:32] portion of the 64-bit register and a second output coupled to the lower [31:0] portion of the 64-bit register.

38. The processor of clause 37, wherein max1≥max2, the output of the instruction is stored as a concatenation of first and second output maximum values stored in the 64-bit register, and the hardware circuit includes logic configured to:

output max1 concatenated with max2 if src2≤max2;

output max1 concatenated with src2 if src2>max2 and src2≤max2; and output src2 concatenated with max1 if src2>max2 and src2>max1.

39. The processor of any of clauses 31-38, wherein the 2MAX instruction is implemented in hardware circuitry comprising:

a 64-bit srcdst register having upper [63:32] and lower [31:0] 32-bit portions, the srcdst register to store a first maximum value max1 in the upper [63:32] portion and a second maximum value max2 in the lower [31:0] portion;

a 64-bit src2 register having upper [63:32] and lower [31:0] 32-bit portions, the src2 register to store a first comparison value el1 in lower 32-bit portion [31:0] and a second comparison value el2 in;

src2 selector logic, coupled to the second 64-bit register, to select either the upper [63:32] or lower [31:0] portions and of the src2 register;

a first comparator, coupled to the output of the src2 selector logic to receive the el1 or el2 value and coupled to the lower [31:0] portion of the 64-bit srcdst register to receive max2;

a second comparator, coupled to the output of the src2 selector logic to receive the el1 or el2 value and coupled to the upper [63:32] portion of the 64-bit srcdst register to receive the max1 value; and a multiplexer having first input coupled to the upper [63:32] portion of the 64-bit srcdst register to receive the max1, a second input coupled to the upper [63:32] portion of the src2 register to receive the el2 value, a third input coupled to the lower [31:0] portion of the src2 register to receive the el1 value, first and second control inputs respectively couple to outputs of the first and second comparators, a third control input to receive a scr2 low or scr2 high signal, a first output coupled to the upper [63:32] portion of the 64-bit srcdst register and a second output coupled to the lower [31:0] portion of the 64-bit srcdst register.

40. The processor of clause 39, wherein max1≥max2, the output of the instruction is stored as a concatenation of first and second output maximum values stored in the 64-bit srcdst register, and the hardware circuit includes logic configured to:

during a first timeframe, output max1 concatenated with max2 if el1≤max2;

output max1 concatenated with src2 if el1>max2 and el1≤max2; and output src2 concatenated with max1 if el1>max2 and el1>max1;

set max1 and max2 to correspond to the upper [63:32] portion and lower [31:0] portion of 64-bit srcdst register;

during a second timeframe;

output max1 concatenated with max2 if el2≤max2;

output max1 concatenated with src2 if el2>max2 and el2≤max2; and output src2 concatenated with max1 if el2>max2 and el2≤max1;

41. The processor of any of clauses 31-40, wherein the 2MAX instruction is implemented in hardware circuitry comprising:

a 64-bit register having upper [63:32] and lower [31:0] 32-bit portions, the 64-bit register to store a first maximum value max1 in the upper [63:32] portion and a second maximum value max2 in the lower [31:0] portion;

a 32-bit register to store a comparison value src2;

a first comparator, coupled to the 32-bit register to receive the src2 value and the lower [31:0] portion of the 64-bit register to receive the max2 value;

a second comparator, coupled to the 32-bit register to receive the src2 value and the upper [63:32] portion of the 64-bit register to receive the max1 value;

a logical OR gate, coupled to an output of the first comparator and an output of the second comparator;

carry flag (CF); and a multiplexer having a first input coupled to the upper [63:32] portion of the 64-bit register to receive the max1 value, a second input coupled to the 32-bit register to receive the src2 value, first and second control inputs respectively coupled to an output of the logical OR gate and the carry flag; a first output coupled to the upper [63:32] portion of the 64-bit register and a second output coupled to the lower [31:0] portion of the 64-bit register.

42. The processor of clause 41, wherein the output of the instruction is stored as a concatenation of first and second output maximum values stored in the 64-bit register, and the hardware circuit includes logic configured to:

output max1 concatenated with max2 if src2≤max2 and src2≤max1;

output max1 concatenated with src2 if src2 is greater than at least one of max1 and max2 and the CF='0', and set the CF to not equal the output of the first comparator; and output src2 concatenated with max2 if src2 is greater than at least one of max1 and max2 and the CF='1', and set the CF equal to the output of the second comparator.

43. The processor of any of clauses 31-42, wherein the processor employs an Arm-based microarchitecture, and wherein the 2MAX instruction is implemented in hardware circuitry comprising:

a 64-bit general purpose register (GPR) having upper [63:32] and lower [31:0] 32-bit portions, the 64-bit GPR to store a first maximum value max1 in the upper [63:32] portion and a second maximum value max2 in the lower [31:0] portion;

a 32-bit GPR to store a comparison value src2;

a first comparator, coupled to the 32-bit GPR to receive the src2 value and the lower [31:0] portion of the 64-bit GPR to receive the max2 value;

a second comparator, coupled to the 32-bit GPR to receive the src2 value and the upper [63:32] portion of the 64-bit GPR to receive the max1 value; and a multiplexer having a first input coupled to the upper [63:32] portion of the 64-bit GPR to receive the max1 value, a second input coupled to the 32-bit register to receive the src2 value, first and second control inputs respectively coupled to outputs of the first and second comparators, a first output coupled to the upper [63:32] portion of the 64-bit GPR and a second output coupled to the lower [31:0] portion of the 64-bit GPR.

44. The processor of clause 43, wherein max1≥max2, the output of the instruction is stored as a concatenation of first and second output maximum values stored in the 64-bit GPR, and the hardware circuit includes logic configured to:

output max1 concatenated with max2 if src2≤max2;

output max1 concatenated with src2 if src2>max2 and src2≤max2; and output src2 concatenated with max1 if src2>max2 and src2>max1.

45. A processor having an instruction set architecture (ISA) including a 128-bit SIMD (Single Instruction Multiple Data) instruction configured, when executed, to output:

a first pair of maximum values among a first set of input values including a first pair of current maximum values and a first comparison value; and a second pair of maximum values among a second set of input values including a second pair of current maximum values and a second comparison value.

46. The processor of clause 45, wherein each of the first pair of maximum values and the second pair of maximum values are ordered.

47. The processor of clause 45 or 46, wherein the 128-bit SIMD instruction is configured to process the first and second set of input values from two 64-bit data-paths in parallel.

48. The processor of any of clauses 45-47, wherein the 128-bit SIMD instruction includes a first operand comprising a concatenation of the first pair of current maximum values and the second pair of maximum values and a second operand comprising a concatenation of the first comparison value and the second comparison value.

49. The processor of clause 48, wherein, during execution of the 128-bit SIMD instruction 128-bits of data corresponding to the first operand is loaded into a first 128-bit register as four 32-bit parameters comprising the first and second pair of maximum values, and data corresponding to the second operand are loaded into a second 128-bit register as two 32-bit parameters comprising the first and second comparison values.

50. The processor of clause 49, wherein, an output of the 128-bit SIMD instruction comprising the first pair of maximum values concatenated with the second pair of maximum values is stored in the first 128-bit register.

51. The processor of any of clauses 45-50, wherein the processor employs an Arm-based microarchitecture, and wherein the 2MAX instruction is implemented in hardware circuitry comprising:

a first 128-bit register to store first max1 and max2 values corresponding to the first pair of maximum values and to store second max1 and max2 values corresponding to the second pair of maximum values;

a second 128-bit register to store a first scr2 value corresponding to the first comparison value and a second scr2 value corresponding to the second comparison value;

a first comparator, coupled to the second 128-bit register to receive the first src2 value and the first 128-bit register to receive the first max2 value;

a second comparator, coupled to the second 128-bit register to receive the first src2 value and the first 128-bit register to receive the first max 1 value;

a first multiplexer having data inputs coupled to each of the first and second 128-bit registers and control inputs respectively coupled to outputs from the first and second comparators;

a third comparator, coupled to the second 128-bit register to receive the second src2 value and the first 128-bit register to receive the second max2 value;

a fourth comparator, coupled to the second 128-bit register to receive the second src2 value and the first 128-bit register to receive the second max 1 value;

a second multiplexer having data inputs coupled to each of the first and second 128-bit registers and control inputs respectively coupled to outputs from the third and fourth comparators.

52. The processor of clause 51, wherein hardware circuitry is configured to process data received from two 64-bit data-paths in parallel.

53. A method for determining the largest two values in a data set having a plurality of data elements, comprising:

one of iteratively or recursively executing a 2MAX instruction in a processor instruction set architecture in conjunction with iterating through the plurality of data elements, wherein the 2MAX instruction has two operands in which data parameters including first and second current maximum values and at least one comparison value are loaded during execution of the 2MAX instruction, wherein the 2MAX instruction outputs two maximum values among the first and second current maximum values and the at least one comparison value.

54. The method of clause 53, wherein the first and second current maximum values are loaded into a single register as a concatenation of the first current maximum value followed by the second maximum value.

55. The method of clause 53 or 54, wherein the at least one comparison value is a first and second comparison value, and the 2MAX instruction outputs two maximum values among the first and second current maximum values and the first and second comparison values.

56. The method of any of clauses 53-55, wherein the processor employs an Arm-based microarchitecture, and the 2MAX instruction includes two operands stored in a 64-bit General Purpose Register (GPR) and a 32-bit GPR during execution of the 2MAX instruction.

57. A method for determining the largest two values in a data set having a plurality of data elements, comprising:

partitioning the data set into first and second halves of the data set;

determining a first pair of maximum values corresponding to the first half of the data set;

determining a second pair of maximum values corresponding to the second half of the data set; and determining the two largest values among the first pair of maximum values and the second pair of maximum values, wherein the first pair and second pair of maximum values are determined in parallel by one of iteratively or recursively executing a 128-bit SIMD (Single Instruction Multiple Data) instruction in a processor instruction set in conjunction with iterating through the first and second halves of the data set.

58. The method of clause 57, wherein the two largest values among the first pair of maximum values and the second pair of maximum values is determined using the 128-bit SIMD instruction.

59. The method of clause 57 or 58, wherein the two largest values among the first pair of maximum values and the second pair of maximum values is determined using a 64-bit instruction included in the processor instruction set.

60. The method of any of clauses 57-59, wherein the processor employs an Arm-based microarchitecture.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A processor comprising:
hardware circuitry configured to implement an instruction set architecture (ISA) having first and second registers and including a 2MIN instruction having a first operand referencing the first register in which data parameters including first and second current minimum values are to be loaded or in which the first and second current minimum values are currently stored and a second operand referencing the second register in which at least one comparison value is loaded during execution of the 2MIN instruction, wherein the 2MIN instruction outputs two minimum values among the first and second current minimum values and the at least one comparison value that are stored in the first register upon completion of the 2MIN instruction.

2. The processor of claim 1, wherein the two minimum values are output in an order.

3. The processor of claim 1, wherein the two minimum values are output unordered.

4. The processor of claim 1, wherein the first and second current minimum values are loaded into the first register as a concatenation of the first current minimum value followed by the second current minimum value.

5. The processor of claim 1, wherein the ISA includes a plurality of microcode instructions implemented in hardware circuitry, and wherein the 2MIN instruction is implemented, at least in part, via the use of microcode instructions from among the plurality of microcode instructions.

6. The processor of claim 1, wherein the at least one comparison value is a first and second comparison value, and the 2MIN instruction outputs two minimum values among the first and second current minimum values and the first and second comparison values.

7. The processor of claim 1, wherein the 2MIN instruction is implemented in hardware circuitry comprising:

a 64-bit register comprising the first register having upper [63:32] and lower [31:0] 32-bit portions, the 64-bit register to store a first minimum value min1 in the upper [63:32] portion and a second minimum value min2 in the lower [31:0] portion;

a 32-bit register comprising the second register to store a comparison value src2;

a first comparator, coupled to the 32-bit register to receive the src2 value and the lower [31:0] portion of the 64-bit register to receive the min2 value;

a second comparator, coupled to the 32-bit register to receive the src2 value and the upper [62:32] portion of the 64-bit register to receive the min1 value; and a multiplexer having a first input coupled to the upper [63:32] portion of the 64-bit register to receive the min1 value, a second input coupled to the 32-bit register to receive the src2 value, first and second control inputs respectively coupled to outputs of the first and second comparators, a first output coupled to the upper [63:32] portion of the 64-bit register and a second output coupled to the lower [31:0] portion of the 64-bit register.

8. The processor of claim 7, wherein min1≤min2, the output of the instruction is stored as a concatenation of first and second output minimum values stored in the 64-bit register, and the hardware circuit includes logic configured to:

output min1 concatenated with min2 if src2≥min2;
output min1 concatenated with src2 if src2<min2 and src2≥min1; and
output src2 concatenated with min1 if src2<min2 and src2<min1.

9. The processor of claim 1, wherein the 2MIN instruction is implemented in hardware circuitry comprising:

a 64-bit srcdst register comprising the first register having upper [63:32] and lower [31:0] 32-bit portions, the srcdst register to store a first minimum value min1 in the upper [63:32] portion and a second minimum value min2 in the lower [31:0] portion;

a 64-bit src2 register comprising the second register having upper [63:32] and lower [31:0] 32-bit portions, the src2 register to store a first comparison value el1 in lower 32-bit portion [31:0] and a second comparison value el2 in;

src2 selector logic, coupled to the second 64-bit register, to select either the upper [63:32] or lower [31:0] portions and of the src2 register;

a first comparator, coupled to the output of the src2 selector logic to receive the el1 or el2 value and coupled to the lower [31:0] portion of the 64-bit srcdst register to receive min2;

a second comparator, coupled to the output of the src2 selector logic to receive the el1 or el2 value and coupled to the upper [63:32] portion of the 64-bit srcdst register to receive the min1 value; and a multiplexer having first input coupled to the upper [63:32] portion of the 64-bit srcdst register to receive the min1, a second input coupled to the upper [63:32] portion of the src2 register to receive the el2 value, a third input coupled to the lower [31:0] portion of the src2 register to receive the el1 value, first and second control inputs respectively couple to outputs of the first and second comparators, a third control input to receive a scr2 low or scr2 high signal, a first output coupled to the upper [63:32] portion of the 64-bit srcdst register and a second output coupled to the lower [31:0] portion of the 64-bit srcdst register.

10. The processor of claim 9, wherein min1≤min2, the output of the instruction is stored as a concatenation of first and second output minimum values stored in the 64-bit srcdst register, and the hardware circuit includes logic configured to:
  during a first timeframe,
    output min1 concatenated with min2 if el1≥min2;
    output min1 concatenated with src2 if el1<min2 and el1≥min1; and
    output src2 concatenated with min1 if el1<min2 and el1<min1;
  set min1 and min2 to correspond to the upper [63:32] portion and lower [31:0] portion of 64-bit srcdst register;
  during a second timeframe;
    output min1 concatenated with min2 if el2≥min2;
    output min1 concatenated with src2 if el2<min2 and el2≥min1; and
    output src2 concatenated with min1 if el2<min2 and el2<min1.

11. The processor of claim 1, wherein the 2MIN instruction is implemented in hardware circuitry comprising:
  a 64-bit register comprising the first register having upper [63:32] and lower [31:0] 32-bit portions, the 64-bit register to store a first minimum value min1 in the upper [63:32] portion and a second minimum value min2 in the lower [31:0] portion;
  a 32-bit register comprising the second register to store a comparison value src2;
  a first comparator, coupled to the 32-bit register to receive the src2 value and the lower [31:0] portion of the 64-bit register to receive the min2 value;
  a second comparator, coupled to the 32-bit register to receive the src2 value and the upper [63:32] portion of the 64-bit register to receive the min1 value;
  a logical OR gate, coupled to an output of the first comparator and an output of the second comparator;
  a carry flag (CF); and
  a multiplexer having a first input coupled to the upper [63:32] portion of the 64-bit register to receive the min1 value, a second input coupled to the 32-bit register to receive the src2 value, first and second control inputs respectively coupled to an output of the logical OR gate and the carry flag; a first output coupled to the upper [63:32] portion of the 64-bit register and a second output coupled to the lower [31:0] portion of the 64-bit register.

12. The processor of claim 11, wherein the output of the instruction is stored as a concatenation of first and second output minimum values stored in the 64-bit register, and the hardware circuitry includes logic configured to:
  output min1 concatenated with min2 if src2≥min2 and src2≥min1;
  output min1 concatenated with src2 if src2 is less than at least one of min1 and min2 and the CF='0', and set the CF to not equal the output of the first comparator; and
  output src2 concatenated with min2 if src2 is less than at least one of min1 and min2 and the CF='1', and set the CF equal to the output of the second comparator.

13. The processor of claim 1, wherein the processor employs an Arm-based microarchitecture, and wherein the 2MIN instruction is implemented in hardware circuitry comprising:
  a 64-bit general purpose register (GPR) comprising the first register having upper [63:32] and lower [31:0] 32-bit portions, the 64-bit GPR to store a first minimum value min1 in the upper [63:32] portion and a second minimum value min2 in the lower [31:0] portion;
  a 32-bit GPR comprising the second register to store a comparison value src2;
  a first comparator, coupled to the 32-bit GPR to receive the src2 value and the lower [31:0] portion of the 64-bit GPR to receive the min2 value;
  a second comparator, coupled to the 32-bit GPR to receive the src2 value and the upper [63:32] portion of the 64-bit GPR to receive the min1 value; and
  a multiplexer having a first input coupled to the upper [63:32] portion of the 64-bit GPR to receive the min1 value, a second input coupled to the 32-bit register to receive the src2 value, first and second control inputs respectively coupled to outputs of the first and second comparators, a first output coupled to the upper [63:32] portion of the 64-bit GPR and a second output coupled to the lower [31:0] portion of the 64-bit GPR.

14. The processor of claim 13, wherein min1≤min2, the output of the instruction is stored as a concatenation of first and second output minimum values stored in the 64-bit GPR, and the hardware circuit includes logic configured to:
  output min1 concatenated with min2 if src2≥min2;
  output min1 concatenated with src2 if src2<min2 and src2≥min1; and
  output src2 concatenated with min1 if src2<min2 and src2<min1.

15. A processor comprising:
  hardware circuitry configured to implement an instruction set architecture (ISA) including a 128-bit SIMD (Single Instruction Multiple Data) instruction configured, when executed, to output:
  a first pair of minimum values among a first set of input values including a first pair of current minimum values and a first comparison value; and
  a second pair of minimum values among a second set of input values including a second pair of current minimum values and a second comparison value.

16. The processor of claim 15, wherein each of the first pair of minimum values and the second pair of minimum values are ordered.

17. The processor of claim 15, wherein the 128-bit SIMD instruction is configured to process the first and second set of input values from two 64-bit data-paths in parallel.

18. The processor of claim 15, wherein the 128-bit SIMD instruction includes a first operand comprising a concatenation of the first pair of current minimum values and the second pair of minimum values and a second operand comprising a concatenation of the first comparison value and the second comparison value.

19. The processor of claim 18, wherein, during execution of the 128-bit SIMD instruction 128-bits of data corresponding to the first operand is loaded into a first 128-bit register as four 32-bit parameters comprising the first and second pair of minimum values, and data corresponding to the second operand are loaded into a second 128-bit register as two 32-bit parameters comprising the first and second comparison values.

20. The processor of claim 19, wherein, an output of the 128-bit SIMD instruction comprising the first pair of minimum values concatenated with the second pair of minimum values is stored in the first 128-bit register.

21. The processor of claim 15, wherein the processor employs an Arm-based microarchitecture, and wherein the 2MIN instruction is implemented in hardware circuitry comprising:

a first 128-bit register to store first min1 and min2 values corresponding to the first pair of minimum values and to store second min1 and min2 values corresponding to the second pair of minimum values;

a second 128-bit register to store a first scr2 value corresponding to the first comparison value and a second scr2 value corresponding to the second comparison value;

a first comparator, coupled to the second 128-bit register to receive the first src2 value and the first 128-bit register to receive the first min2 value;

a second comparator, coupled to the second 128-bit register to receive the first src2 value and the first 128-bit register to receive the first min 1 value;

a first multiplexer having data inputs coupled to each of the first and second 128-bit registers and control inputs respectively coupled to outputs from the first and second comparators;

a third comparator, coupled to the second 128-bit register to receive the second src2 value and the first 128-bit register to receive the second min2 value;

a fourth comparator, coupled to the second 128-bit register to receive the second src2 value and the first 128-bit register to receive the second min 1 value;

a second multiplexer having data inputs coupled to each of the first and second 128-bit registers and control inputs respectively coupled to outputs from the third and fourth comparators.

22. The processor of claim 21, wherein hardware circuitry is configured to process data received from two 64-bit data-paths in parallel.

23. A method for determining the smallest two values in a data set having a plurality of data elements implemented on a processor comprising hardware circuitry configured to implement an instruction set architecture (ISA) including a 2MIN instruction, wherein the 2MIN instruction has two operands in which data parameters including first and second current minimum values and at least one comparison value are loaded during execution of the 2MIN instruction, wherein the 2MIN instruction outputs two minimum values among the first and second current minimum values and the at least one comparison value, the method comprising:

one of iteratively or recursively executing the 2MIN instruction on the processor in conjunction with iterating through the plurality of data elements, wherein the iterative or recursive execution of the 2MIN instruction output the two smallest values among the plurality of data elements.

24. The method of claim 23, wherein the first and second current minimum values are loaded into a single register on the processor as a concatenation of the first current minimum value followed by the second minimum value.

25. The method of claim 23, wherein the at least one comparison value is a first and second comparison value, and the 2MIN instruction outputs two minimum values among the first and second current minimum values and the first and second comparison values.

26. The method of claim 23, wherein the processor employs an Arm-based microarchitecture, and the 2MIN instruction includes two operands stored in a 64-bit General Purpose Register (GPR) and a 32-bit GPR during execution of the 2MIN instruction.

27. A method for determining the smallest two values in a data set having a plurality of data elements implemented on a processor comprising hardware circuitry configured to implement an instruction set architecture (ISA) including a 128-bit SIMD (Single Instruction Multiple Data) instruction configured, when executed, to output a first pair of minimum values among a first set of input values including a first pair of current minimum values and a first comparison value, and a second pair of minimum values among a second set of input values including a second pair of current minimum values and a second comparison value, the method comprising:

partitioning the data set into first and second halves of the data set;

determining a first pair of minimum values corresponding to the first half of the data set;

determining a second pair of minimum values corresponding to the second half of the data set; and determining the two smallest values among the first pair of minimum values and the second pair of minimum values, wherein the first pair and second pair of minimum values are determined in parallel by one of iteratively or recursively executing the 128-bit SIMD instruction on the processor in conjunction with iterating through the first and second halves of the data set.

28. The method of claim 27, wherein the two smallest values among the first pair of minimum values and the second pair of minimum values is determined using the 128-bit SIMD instruction.

29. The method of claim 27, wherein the processor ISA includes a 64-bit instruction configured, when executed, to output two smallest values among a plurality of input values, and wherein the two smallest values among the first pair of minimum values and the second pair of minimum values is determined by executing the 64-bit instruction.

30. The method of claim 27, wherein the processor employs an Arm-based microarchitecture.

* * * * *